US012618498B2

(12) United States Patent
Haugo

(10) Patent No.: US 12,618,498 B2
(45) Date of Patent: May 5, 2026

(54) PIN SWIVEL DESIGNS

(71) Applicant: United Equipment Accessories, Inc.,
Waverly, IA (US)

(72) Inventor: Brady Haugo, Waterloo, IA (US)

(73) Assignee: United Equipment Accessories, Inc.

( * ) Notice: Subject to any disclaimer, the term of this
patent is extended or adjusted under 35
U.S.C. 154(b) by 0 days.

(21) Appl. No.: 18/593,342

(22) Filed: Mar. 1, 2024

(65) Prior Publication Data

US 2025/0075833 A1 Mar. 6, 2025

Related U.S. Application Data

(60) Provisional application No. 63/579,653, filed on Aug.
30, 2023.

(51) Int. Cl.
*F16L 27/087* (2006.01)
*F16L 27/08* (2006.01)
(52) U.S. Cl.
CPC ......... *F16L 27/0816* (2013.01); *F16L 27/087*
(2013.01); *F16L 27/0828* (2013.01)
(58) Field of Classification Search
CPC . F16L 27/0816; F16L 27/0828; F16L 27/087;
F16L 27/093; F16L 37/53; F16L 39/04
See application file for complete search history.

(56) References Cited

U.S. PATENT DOCUMENTS

| | | | | |
|---|---|---|---|---|
| 2,458,343 | A | * | 1/1949 | Carleton ............... F16L 27/087 |
| | | | | 285/190 |
| 2018/0282975 | A1 | * | 10/2018 | Kawamura ......... F16L 27/0804 |
| 2022/0136208 | A1 | * | 5/2022 | Okada ..................... E02F 9/121 |
| | | | | 285/93 |
| 2024/0288105 | A1 | * | 8/2024 | Cochran ............... F16L 27/087 |

FOREIGN PATENT DOCUMENTS

| | | | | |
|---|---|---|---|---|
| CA | 2752082 | A1 | * 3/2012 | .............. F16L 37/34 |
| DE | 2439527 | A1 | * 4/1975 | |
| DE | 3016589 | A1 | * 11/1981 | |
| EP | 0037176 | A2 | * 10/1981 | |
| EP | 1939133 | A1 | * 7/2008 | ........... E02F 3/3681 |
| FR | 1383037 | A | * 12/1964 | |

* cited by examiner

*Primary Examiner* — Zachary T Dragicevich
*Assistant Examiner* — James A Linford
(74) *Attorney, Agent, or Firm* — David M. Breiner;
BrownWinick Law Firm

(57) ABSTRACT
Disclosed are pin swivels. In at least one example embodiment, a pin swivel includes a housing attachable to a mechanical assembly and a spool rotationally supported by the housing. In at least one example embodiment the housing includes at least one port configured to connect to at least one hose to receive at least one fluid from the at least one hose, and at least one channel configured to transfer the at least one fluid to at least one fluid transfer area. In at least one example the spool has at least one channel in fluid communication with the at least one fluid transfer area of the housing to receive the at least one fluid from the at least one fluid transfer area, and at least one port configured to receive the at least one fluid from the at least one channel of the spool.

8 Claims, 79 Drawing Sheets

SECTION U-U

200

100

700

SECTION A-A

SECTION F-F

SECTION G-G

200

200

200

240

250

222

SECTION B-B

SECTION C-C

SECTION D-D

SECTION E-E

2000

2000

2000

SECTION A-A

2000

SECTION B-B

2000

SECTION C-C

2100

2100

2100

SECTION J-J

SECTION H-H

2250

2250

SECTION F-F

SECTION G-G

SECTION E-E

3200

3100

3900

SECTION A-A

SECTION B-B

SECTION D-D

3100

3100

3100

3100

3100

SECTION K-K

3100

SECTION L-L

SECTION M-M

—3100

SECTION N-N

SECTION P-P

3200

3210

3200

3200

SECTION E-E

3200

SECTION F-F

3200

SECTION G-G

3200

SECTION H-H

3200

SECTION J-J

3200

3200

3200

SECTION U-U

3200

SECTION V-V

PIN SWIVEL DESIGNS

BACKGROUND

1. Field

Example embodiments disclose pin swivels usable in various industries.

2. Description of the Related Art

Excavators, backhoes, and bulldozers, amongst other equipment, often rely on hoses to transmit hydraulic power. Hoses are cheap and easy to install and are generally efficient at transferring hydraulic fluid.

SUMMARY

The inventor has found that while hoses are efficient at transferring hydraulic fluid from one place to another, it is not without its problems. Hoses tend to fatigue over time and, if not timely replaced, fail resulting in machine downtime, delayed timelines, and hose replacement costs. Additionally, hoses are often grouped together with tape or cable to keep them from being snagged while the equipment is operating. This may lead to abrasion which could cause the hoses to fail faster. Thus, the inventor sought out an alternative to hoses. As a result, the inventor has invented new pin swivels that can efficiently transmit hydraulic fluid without suffering the problems associated with conventional hoses. The invention, however, can be applied across various industries and types of equipment and therefore should not be limited to machines that are hydraulic in nature.

BRIEF DESCRIPTION OF THE DRAWINGS

Example embodiments are described in detail below with reference to the attached drawing figures, wherein.

DETAILED DESCRIPTION

Figure 1A:
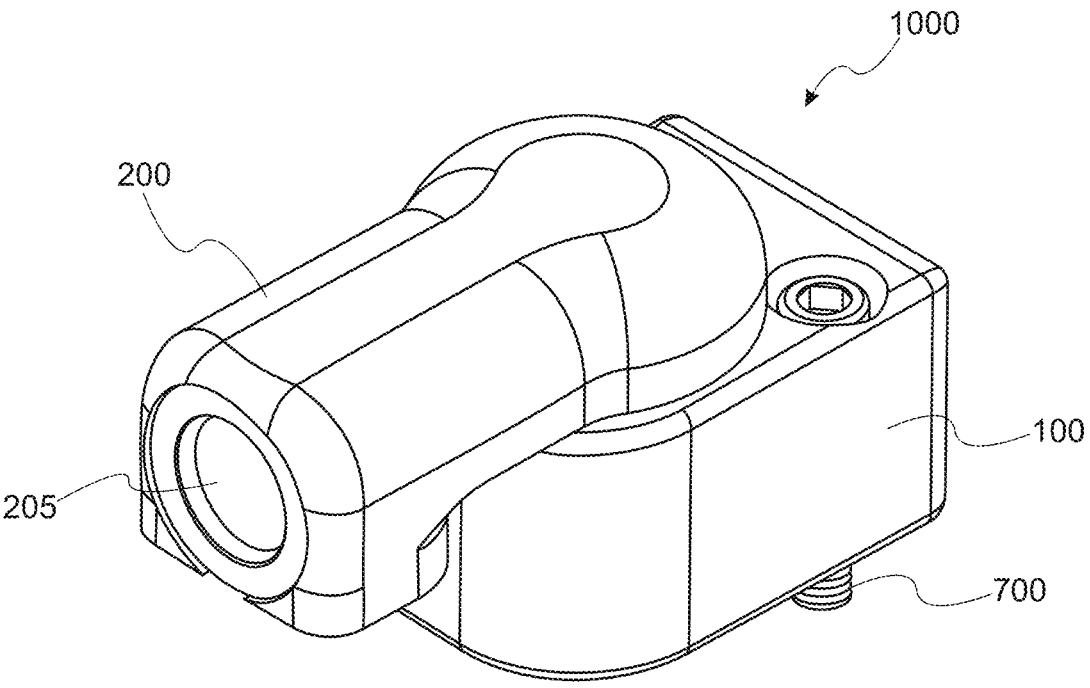
FIGS. 1A-1J are views of a pin swivel in accordance with example embodiments.
Figure 1B:
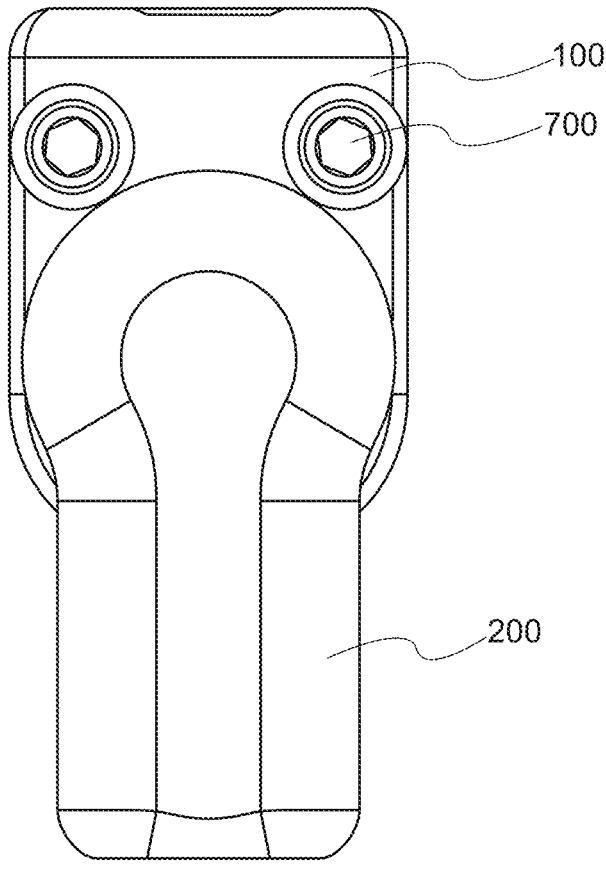
Figure 1C:
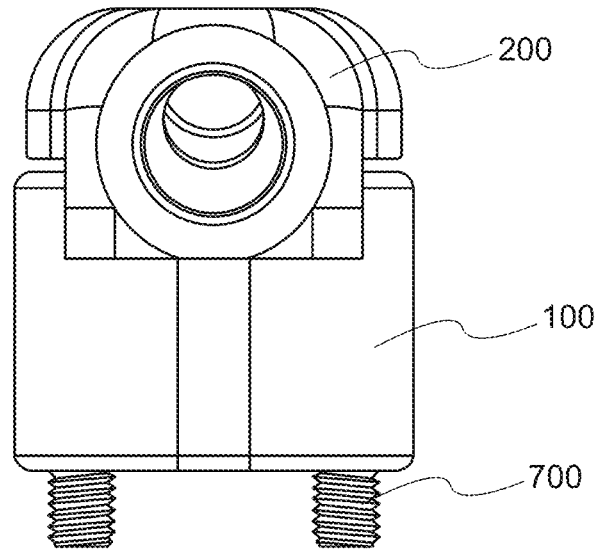
Figure 1D:
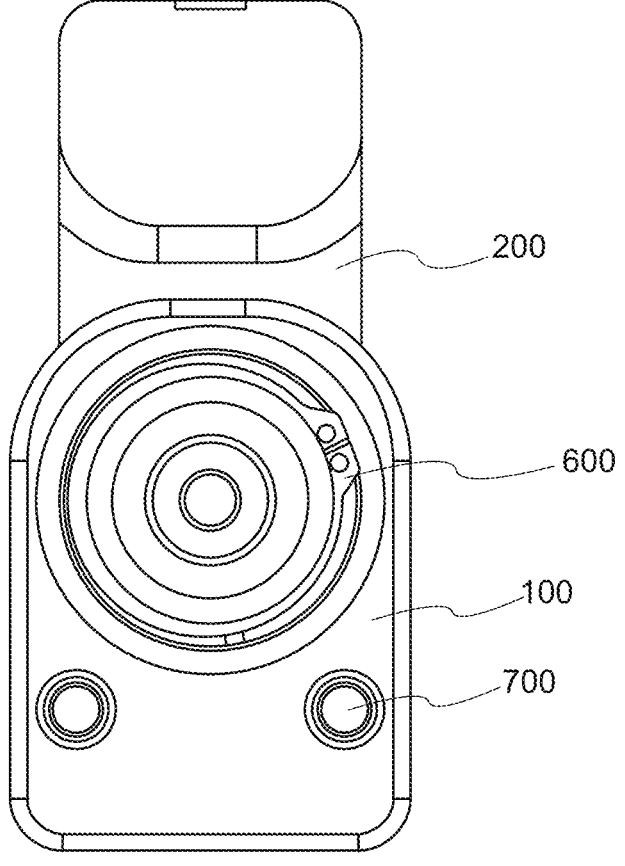
Figure 1E:
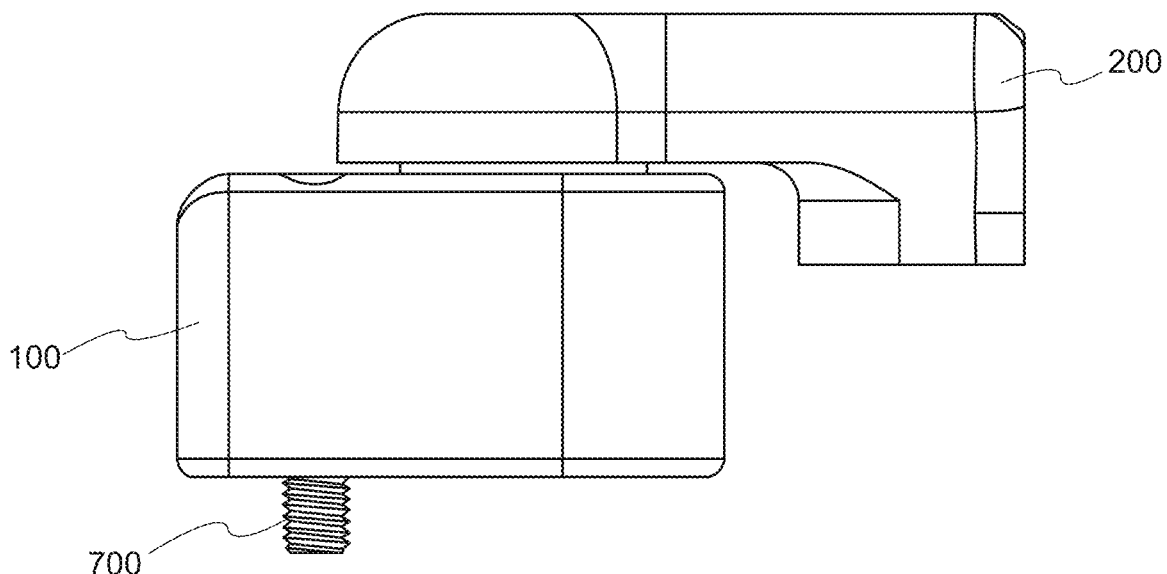
Figure 1F:
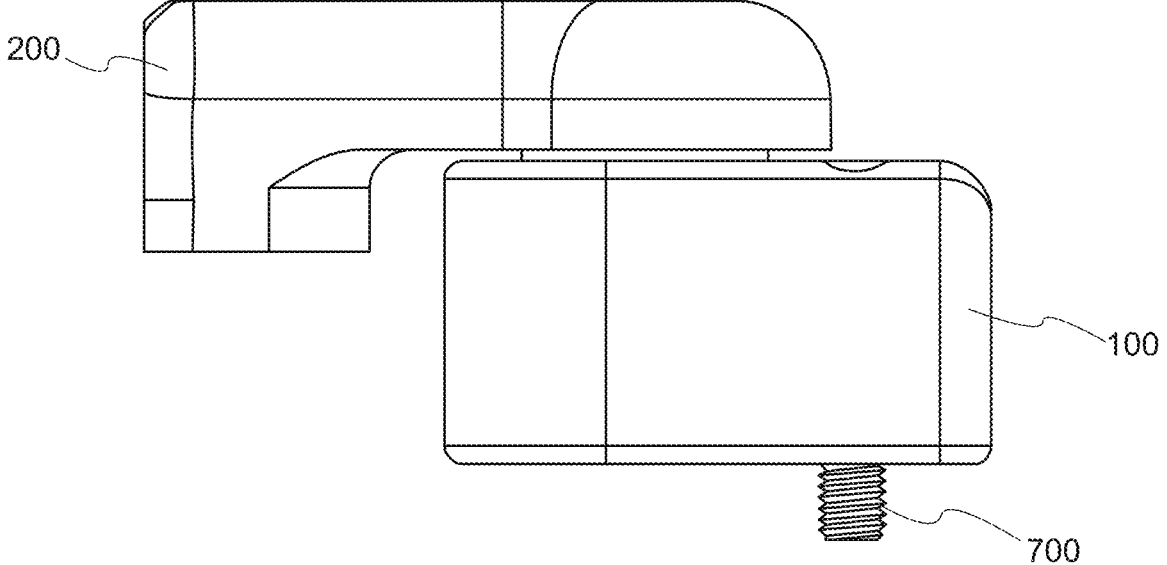
Figure 1G:
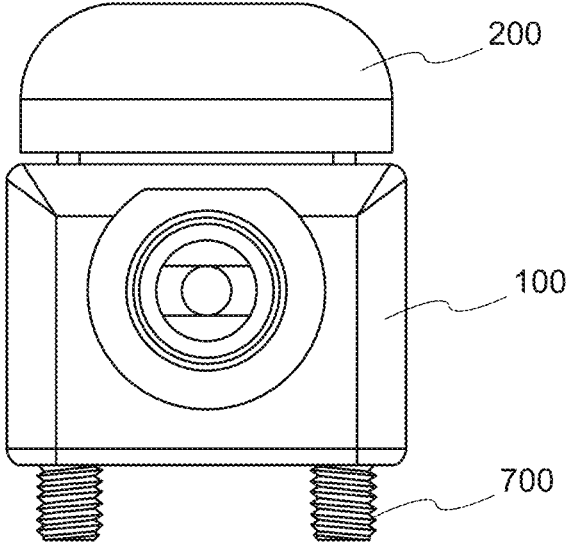
Figure 1H:
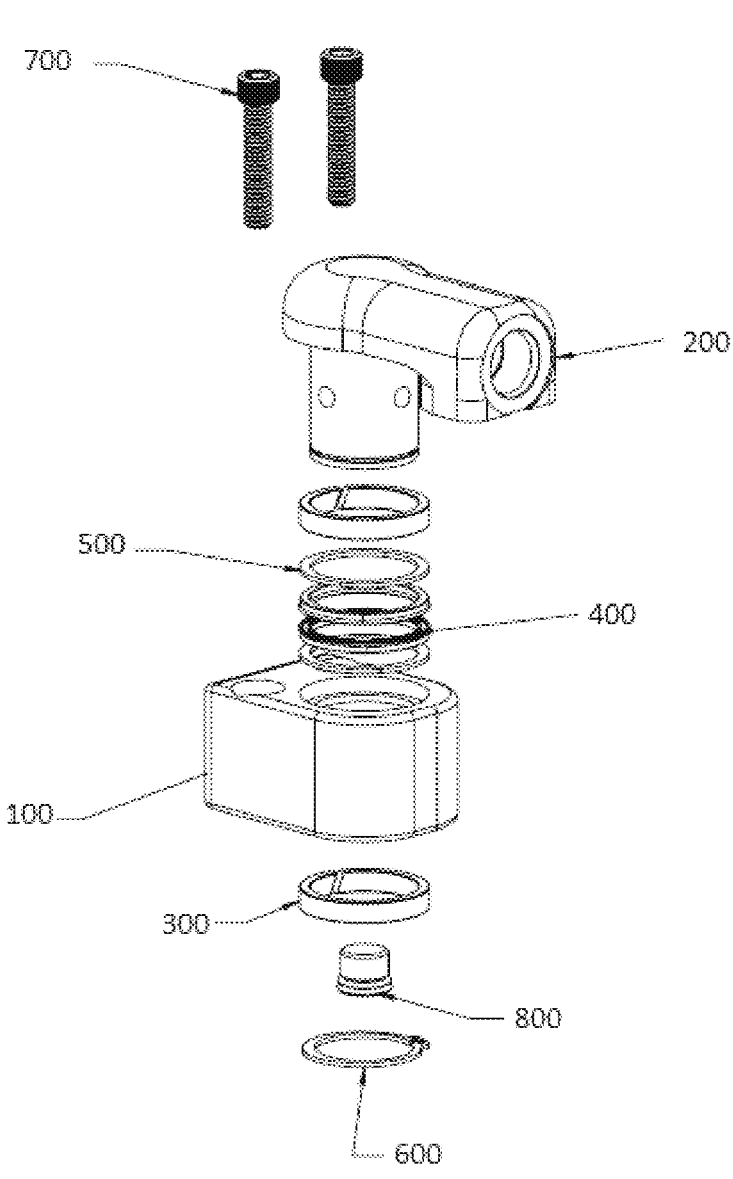

Example embodiments will now be described more fully with reference to the accompanying drawings. Example embodiments are not intended to limit the invention since the invention may be embodied in different forms. Rather, example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Example embodiments disclose various pin swivels in accordance with example embodiments.

As one skilled in the art will appreciate, when a piece of machinery uses fluid power, many different types of components are used within the system. One of the most common pieces is a hydraulic cylinder. A hydraulic cylinder is a device that converts fluid power into linear motion, allowing the machinery to move, lift, and rotate. The hydraulic cylinder is designed to move its rod into and out of the body, this requires special types of seals to ensure that the hydraulic fluid does not escape from the cylinder. There are two distinct sets of seals in the hydraulic cylinder, rod seals and piston seals. The rod seals, also called ID dynamic, keep oil from escaping near the rod, piston seals, also known as OD dynamic, keep oil on the correct side of the piston.

In a hydraulic cylinder the seals used at the rod and piston both move in the axial direction. The axial movement of hydraulic cylinder seals creates the need for certain geometry of the seal. One of the of the main concerns with seals used in hydraulic cylinders is stability, or the ability to not twist and tip within its seal gland.

A hydraulic swivel is another type of component used within the fluid power segment. Hydraulic swivels use similar seals to that of the hydraulic cylinder with a couple key differences. For the most part hydraulic swivels only move in a rotary fashion, they do not slide in and out like a cylinder. The seals within a swivel, also need to have stability within its seal gland, as to not allow a situation called 'by pass', where the seal twists within its groove and allows fluid to by pass the seal. The swivel seal also needs to have the correct dynamic movement between the different components of the seal. The seal contains a hard ring (or circuit seal) and soft energizer. The energizer squeezes the circuit seal when pressure is applied, the energizer also tries to hold onto the circuit seal. Depending on whether its OD or ID dynamic, the energizer may sit on ID or OD of the circuit seal. If the energizer doesn't continue to hold onto the circuit seal, it will wear down and no longer will be able to do its job. While there are other smaller differences between the hydraulic cylinder and swivel seal, these differences in the dynamics of how the seals move are the largest differentiators.

Figure 1I:
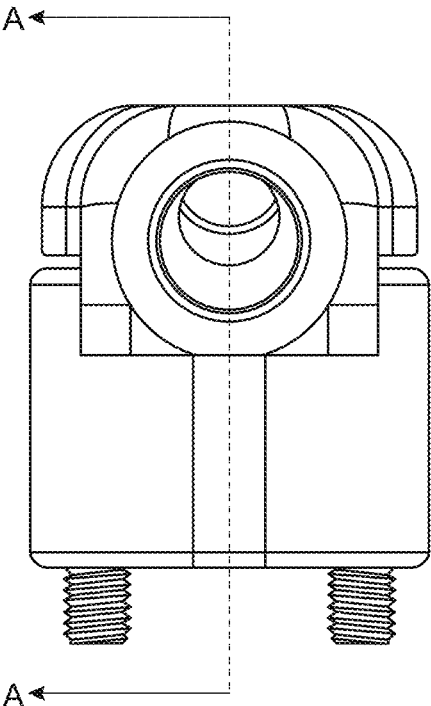
Figure 1J:
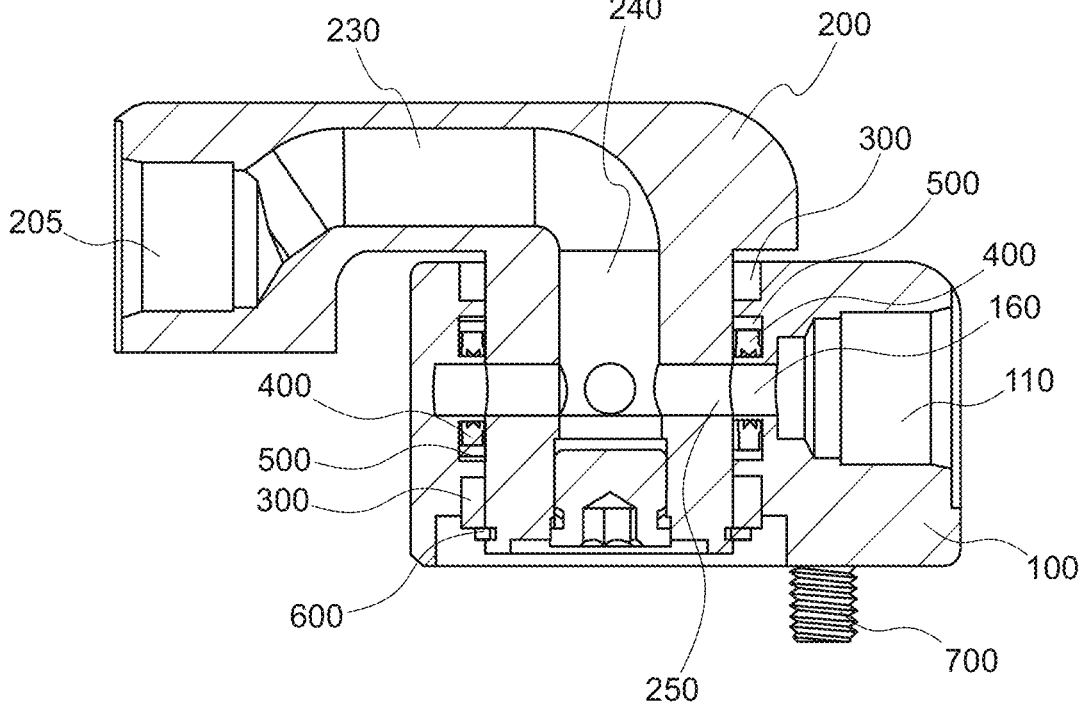
Figure 2A:
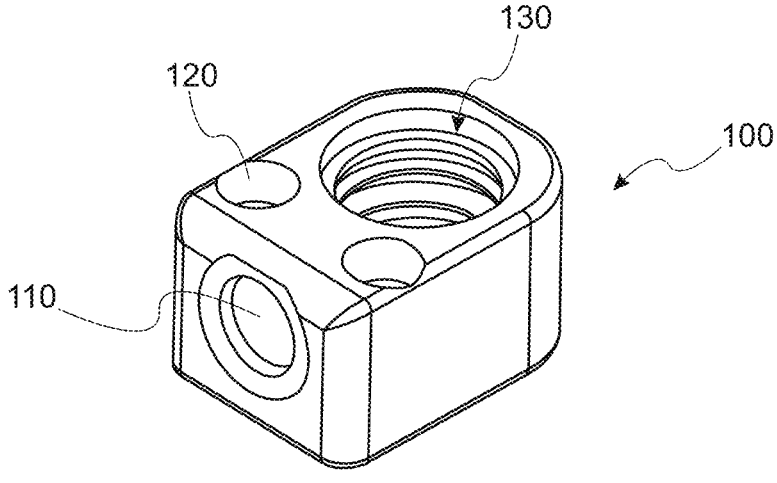
FIGS. 2A-2F are views of a housing in accordance with example embodiments.
Figure 2B:
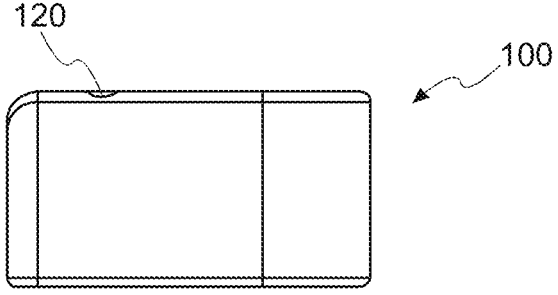
Figure 2C:
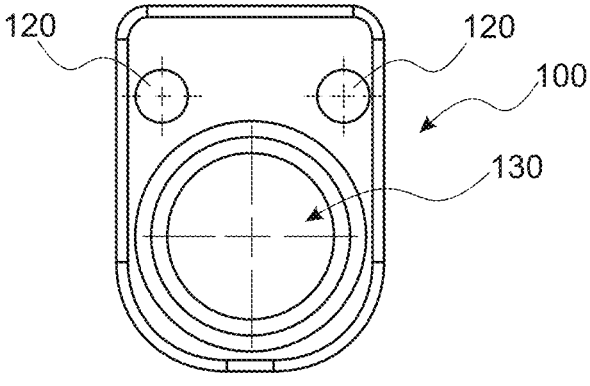
Figure 2D:
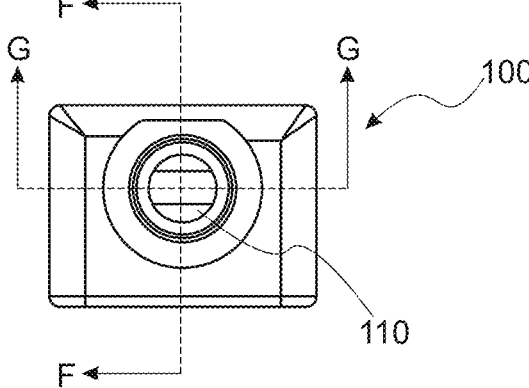
Figure 2E:
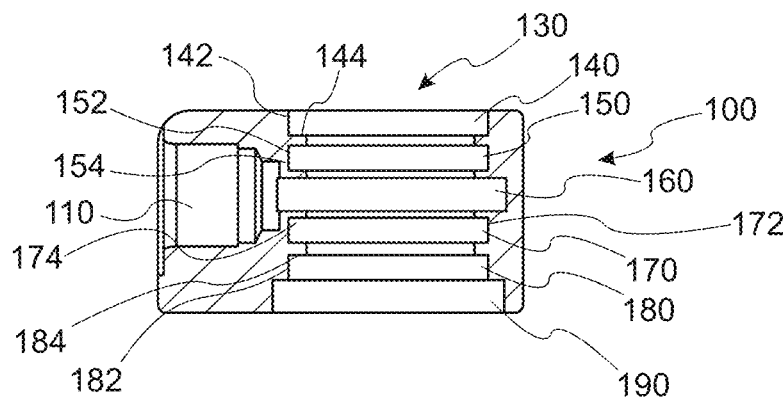
Figure 2F:
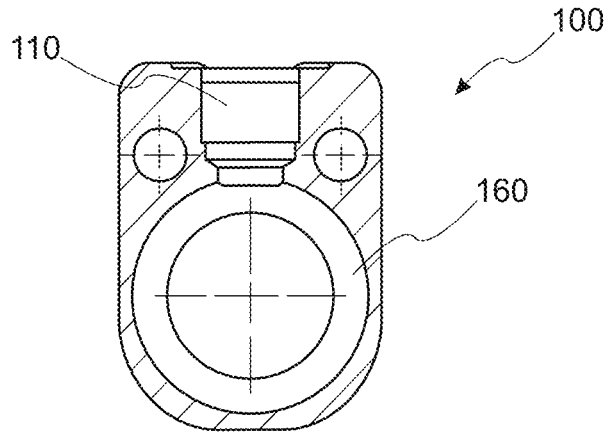

FIG. 1A is a perspective view of a pin swivel 1000 in accordance with an example embodiment of the invention. FIGS. 1B-1H show a top view, a front view, a bottom view, a left side view, a right side view, a back side view, and an exploded view of the pin swivel 1000. FIG. 1I is another front view of the pin swivel 1000 and FIG. 1J is a cross-section view of the pin swivel 1000 taken along section line A-A of FIG. 1I. As shown in FIGS. 1A-1J, the pin swivel 1000 may include various elements including a housing 100, a spool 200, wear bands 300, U Cup Seals 400, back up rings 500, a retaining ring 600, and fasteners 700. The pin swivel 1000 may include additional elements such as, but not limited to, a port plug 800 which may be used to reinforce a port when the pin swivel 1000 is shipped. As will be shortly explained, housing 100 and spool 200 may have channels and recesses in fluid communication with one another so that a fluid, for example, a gas or a liquid, can flow into the housing 100 via the spool 200 or from the housing 100 and into the spool 200. As will also be explained the spool 200 is rotationally attached to the housing 100 so the spool 200 can swivel with respect to the housing 100 while still allowing fluid to flow from the spool 200 into the housing 100 or from the housing 100 into the spool 200.

FIGS. 2A-2F show various views of the housing 100. More specifically, FIGS. 2A-2F show a perspective view, a side view, a top view, a front view, a first cross-section view taken through section line FF of FIG. 2D, and a second cross-section view taken through section line G-G of FIG. 2D. In at least one nonlimiting example embodiment the housing 100 is a substantially solid member having various passages formed therein. For example, passages 120 may extend from a top of the housing 100 to the bottom of the housing to allow the fasteners 700 to pass therethrough for the purpose of attaching the housing 100 to a structure. Additionally, the housing 100 may have a receiving area 130 therein to accommodate the spool 200, the wear bands 300, the U Cup seals 400, the back up rings 500, and the retaining ring 600 as well as facilitate fluid flow between the housing 100 and the spool 200. For example, the receiving area 130 may include a first area 140 having a cylindrical wall 142 and floor 144 where the cylindrical wall has a diameter about the same size as (or slightly larger than) the diameter of a wear band 300. This allows a wear band 300 to be inserted into the housing 100, be laterally restrained by the cylindrical wall 142, and supported by the floor 144. As another example, the receiving area 130 may include a second area 150 having a cylindrical wall 152 and a floor 154 wherein the cylindrical wall 152 has a diameter about the same size as a U cup seal 400 and a back up ring 500 to allow the U cup seal 400 and back up ring 500 to reside therein. As yet another example, the receiving area 130 may include a third area 180 having a cylindrical wall 182 and floor 184 where the cylindrical wall has a diameter about the same size as (or slightly larger than) the diameter of a wear band 300. This allows a wear band 300 to be inserted into the housing 100, be laterally restrained by the cylindrical wall 182, and be supported by the floor 184. As another example, the receiving area 130 may include a fourth area 170 having a cylindrical wall 172 and a floor 174 wherein the cylindrical wall 172 has a diameter about the same size as a U cup seal 400 and a back up ring 500 to allow the U cup seal 400 and back up ring 500 to reside therein. Finally, the housing 100 may have recessed area 190 into which an end of the spool 200 may be exposed. This area 190 may allow the retaining ring 600 to reside therein to capture an end of the spool 200. The retaining ring 600 prevents the spool 200 from pulling out of the housing 100 while allowing the spool 200 to rotate therein.

In addition to the above, the housing 100 may include a fluid transfer area 160 which may be in fluid communication with a port 110 which may be arranged at an end of the housing 100. The port 110 may allow attachment of a conventional connector to the housing 100. As will be explained shortly, a barrel 220 of the spool 200 may insert into the housing 100 and the barrel 220 may have fluid communication channels which allow fluid (for example, air or liquid) to flow into fluid transfer area 160 from the spool 200 or receive fluid from the fluid transfer area 160.

FIGS. 3A-3H are various views of a spool 200 in accordance with example embodiments. More specifically, FIGS. 3A-3H show a perspective view of the spool 200, a front view of the spool 200, a bottom view of the spool 200, a side view of the spool 200 (along with various section lines), a section view of the spool 200 taken along section line B-B of FIG. 3D, a section view of the spool 200 taken along section line C-C of FIG. 3D, a section view of the spool 200 taken along section line D-D of FIG. 3D, and a section view of the spool 200 taken along section line E-E of FIG. 3D. As shown in FIGS. 3A-3H the spool 200 may have a main body 210 with a barrel 220 extending therefrom. Near the bottom of the barrel 220 is a recessed area 222 which may be exposed in the recessed area 190 of the housing 100 when the barrel 220 is inserted into the housing 100. The recessed area 222 which receive the retaining ring 600 to prevent the barrel 220 from pulling out of the receiving area 130.

Figure 3A:
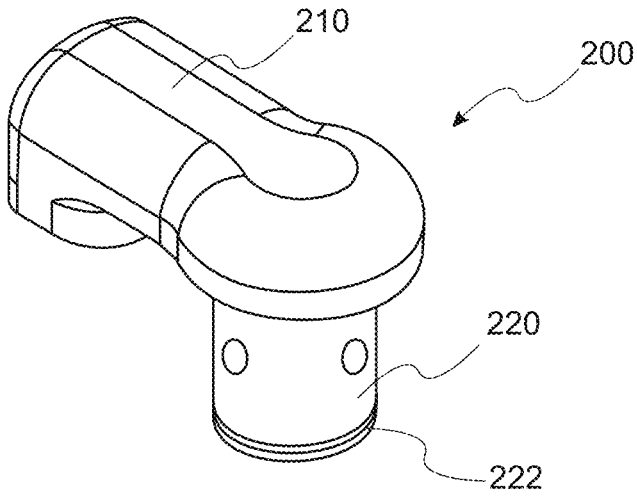
FIGS. 3A-3H are views of a spool in accordance with example embodiments.
Figure 3B:
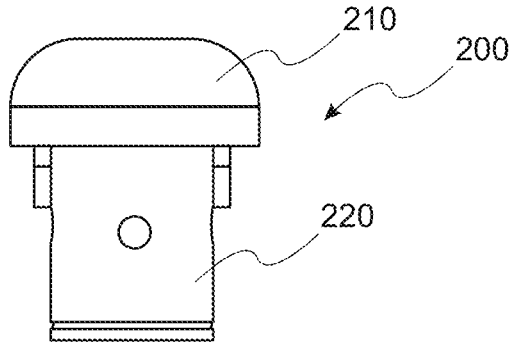
Figure 3C:
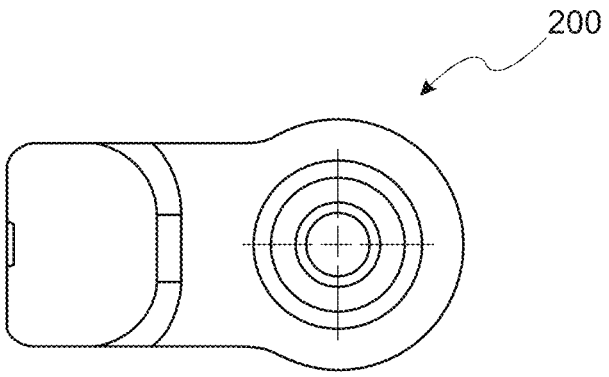
Figure 3D:
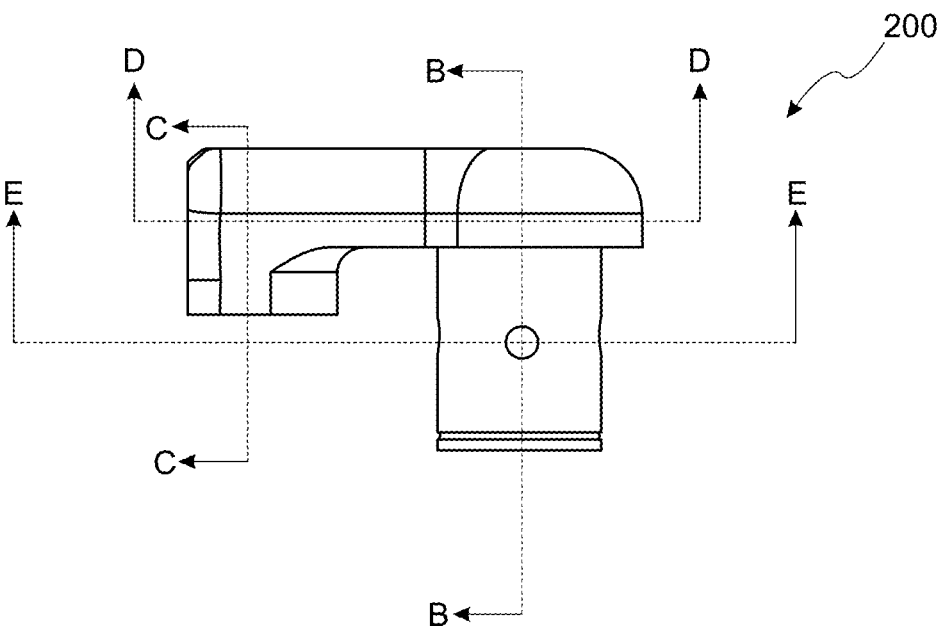
Figure 3E:
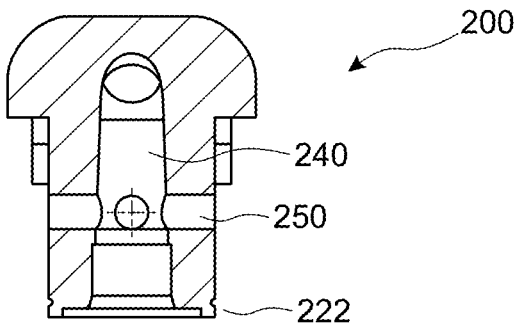
Figure 3F:
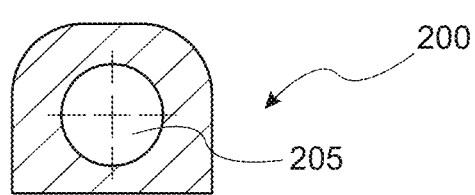
Figure 3G:
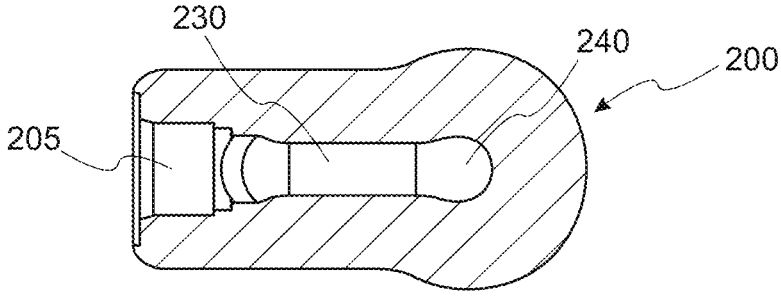
Figure 3H:
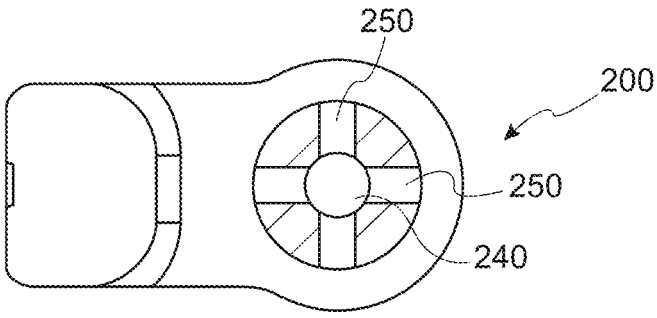

Near an end of the body 210 is a port 205 which may allow connection to a conventional connector. Port 205 may allow a fluid to enter or exit the body 210. As shown in at least FIG. 3G, the port 205 is in fluid communication with a first channel 230 which extends along the body 210 and to a second channel 240 which extends downward and into the barrel 220. The second channel 240 is in fluid communication with one or more channels 250 which exit the barrel 220 as shown in FIG. 3H. When installed into the housing 100, the channels 250 are positioned in the fluid transfer area 160 of the housing 100 as shown in at least FIG. 1J. Thus, when assembled, fluid may enter the a pin swivel 1000 via port 205 and flow through the spool body 210 via the first channel 230 and into the barrel 220 via the second channel 240, and out of the barrel 220 through the one or more channels 250 and into the fluid transfer area 160 where it may leave the fluid transfer area 160 via the port 110. Conversely, when assembled, fluid may enter the pin swivel 1000 via the port 110 and enter the fluid transfer area 160 which may thereafter flow into the one more channels 150 and into the second channel 240 where the fluid may flow into the first channel 230 and out the pin swivel 1000 via port 205. In example embodiments the first channel 230 and the second channel 240 may be perpendicular to each other and the second channel 240 and the one or more channels 150 may also be perpendicular to each other. While this configuration has some advantages, the inventive concepts may allow for channels which do not have this configuration.

In example embodiments the backup rings 500 may resemble an annulus having an inside diameter about the same as, or slightly larger than, the diameter of the barrel 220. In some embodiments, the inside diameter of the backup rings 500 may be slightly smaller than the diameter of the barrel 220 when the backup rings 500 are comprised of a resilient material. Similarly, the U-cup seals 400 may resemble an annulus having an inside diameter about the same as, or slightly larger than, the diameter of the barrel 220. In some embodiments, the inside diameter of the U-cup seals 400 may be slightly smaller than the diameter of the barrel 220 when the U-cup seals 400 are comprised of a resilient material. In example embodiments a section of the U-cup seals 400 may be U-shaped whereas a section of the backup rings 500 may be somewhat rectangular. In some applications, the backup rings 500 and U-cup seals 400 are desirable to prevent fluid from leaking from the pin swivel 1000. In some situations, this may be highly desirable, for example, when the fluid is under a high pressure. In other applications, for example, when the pressure of the fluid is low, the backup rings 500 and U-cup seals 400 may be omitted. Regardless, exemplary suitable materials for the back rings 500 and U-cup seals are POM and urethane. As for the housing 100 and the spool 200, one skilled in the art would recognize a number of suitable materials, however, without intending to limit the invention, ductile iron has been found to work well. As for the wear bands 300, one skilled in the art would recognize a number of suitable materials, however, without intending to limit the invention, glass-filled nylon plastic has been found to work well.

Figure 4A:
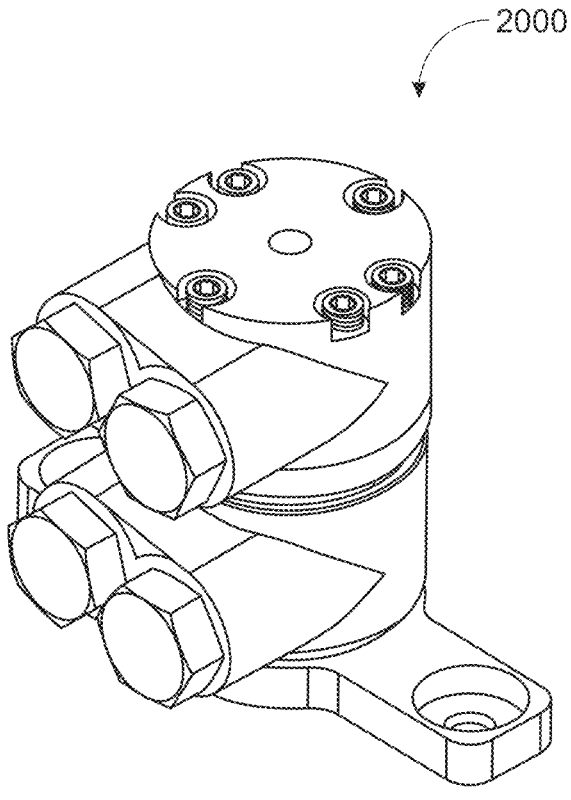
FIGS. 4A-4L are views of another pin swivel in accordance with example embodiments.
Figure 4B:
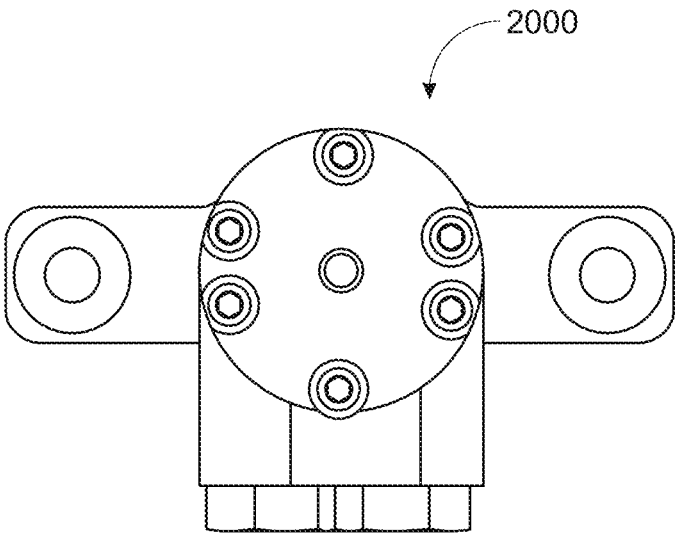
Figure 4C:
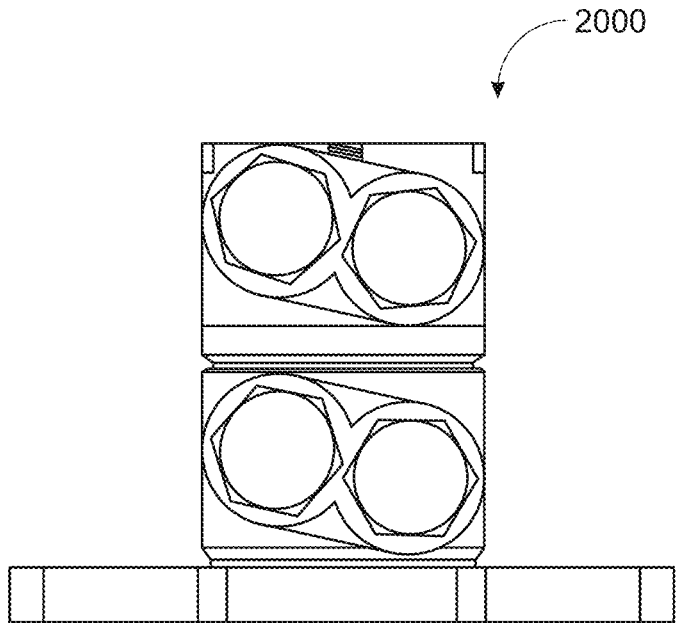
Figure 4D:
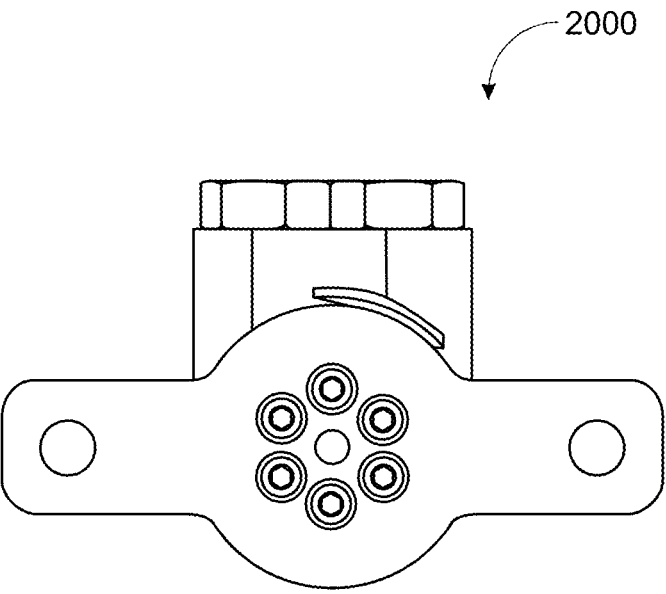
Figure 4E:
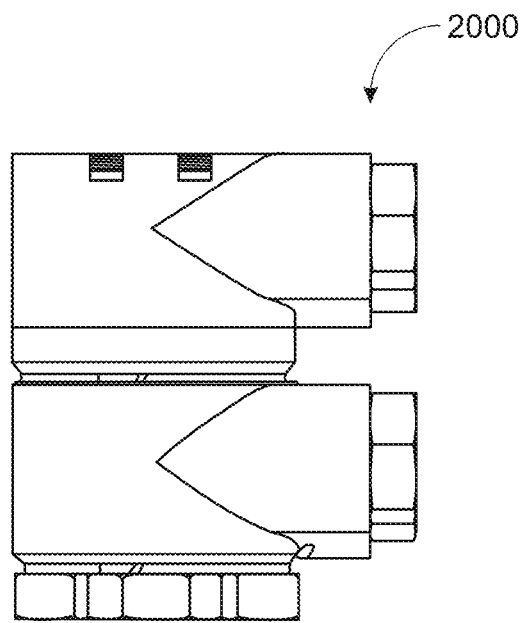
Figure 4F:
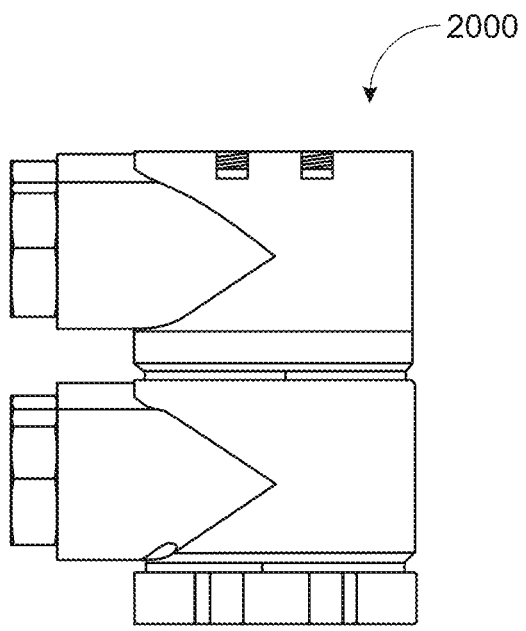
Figure 4G:
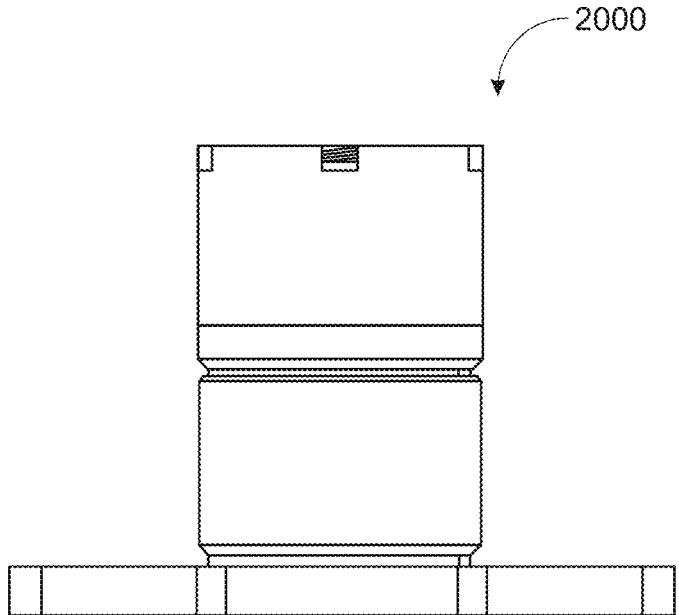
Figure 4H:
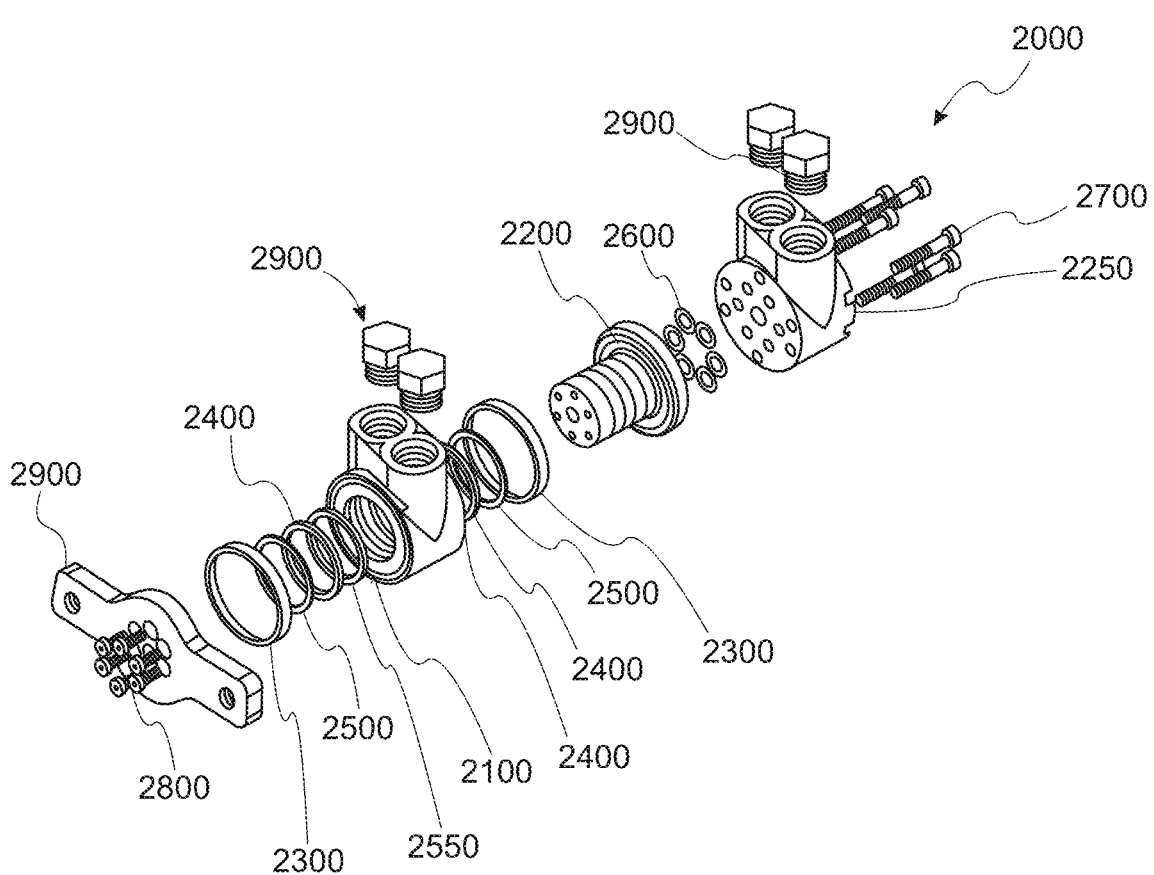
Figure 4I:
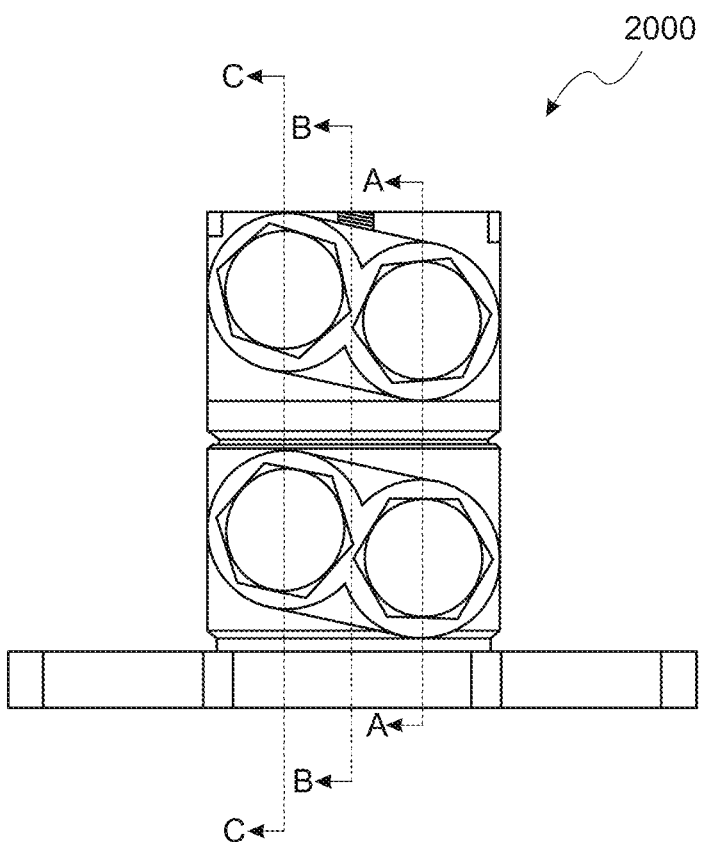
Figure 4J:
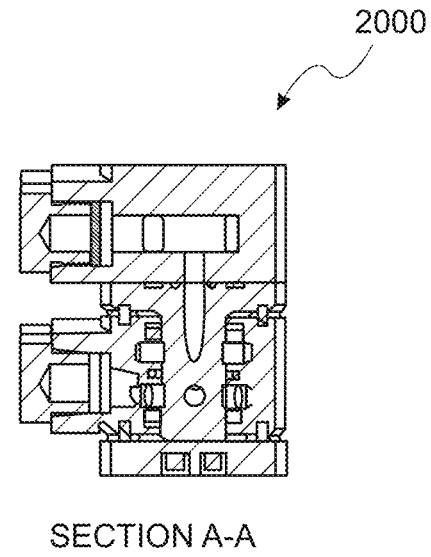
Figure 4K:
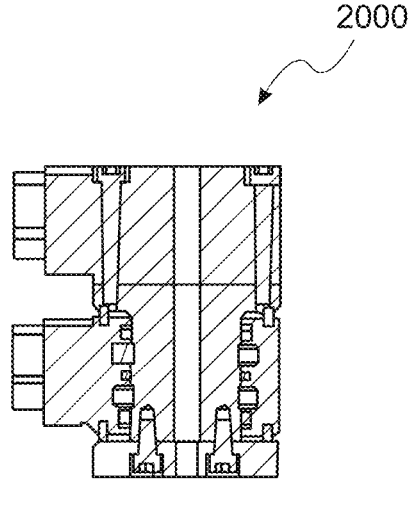
Figure 4L:
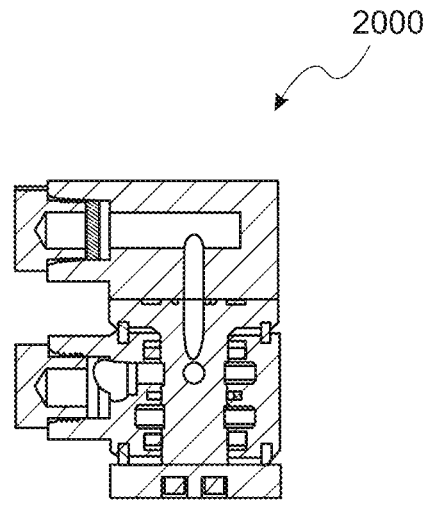
Figure 5A:
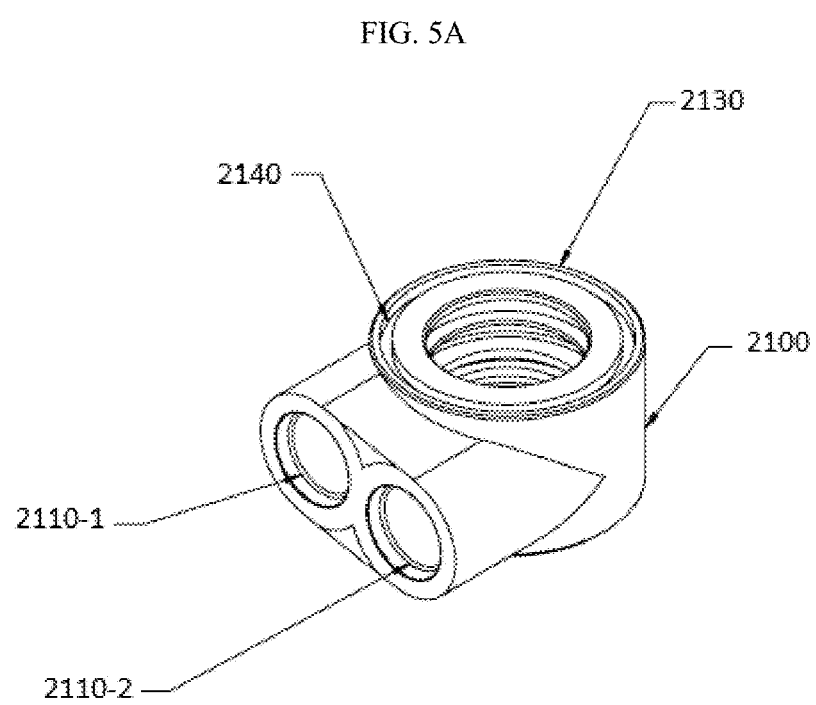
FIGS. 5A-5E are views of a housing in accordance with example embodiments.
Figure 5B:
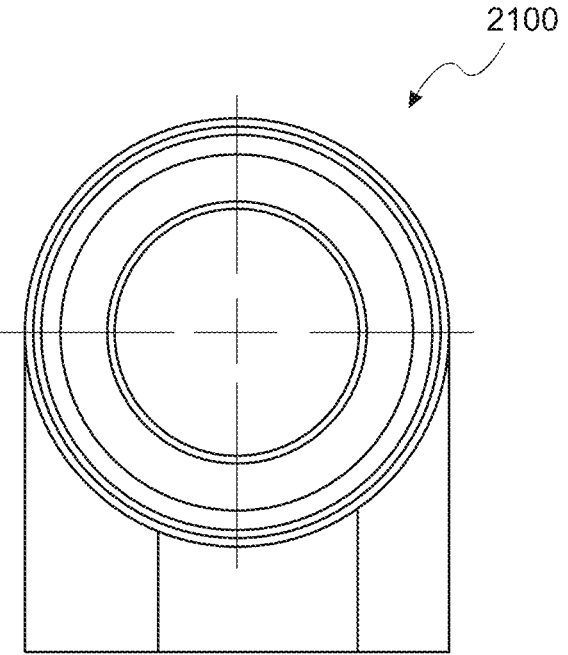
Figure 5C:
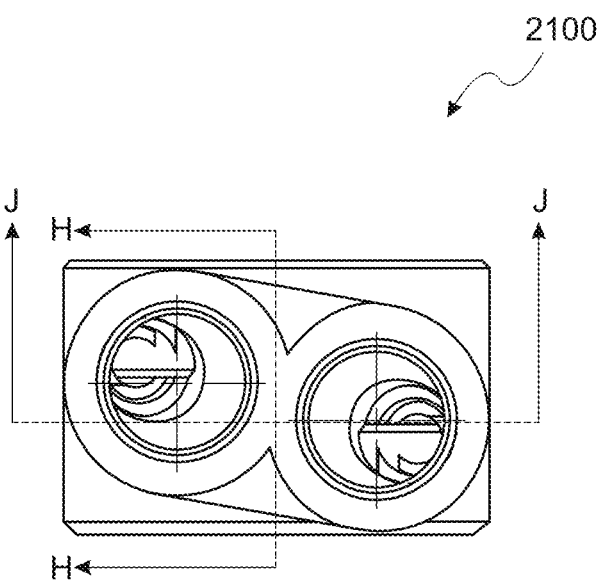
Figure 5D:
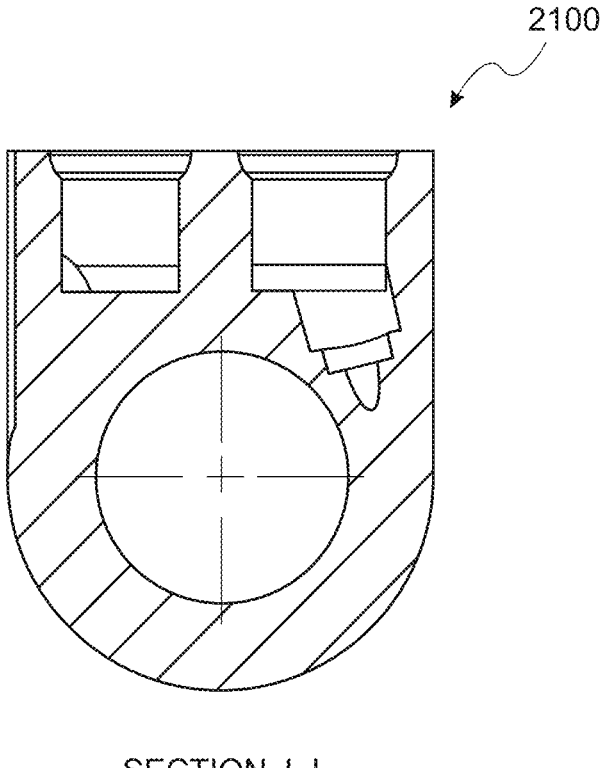
Figure 5E:
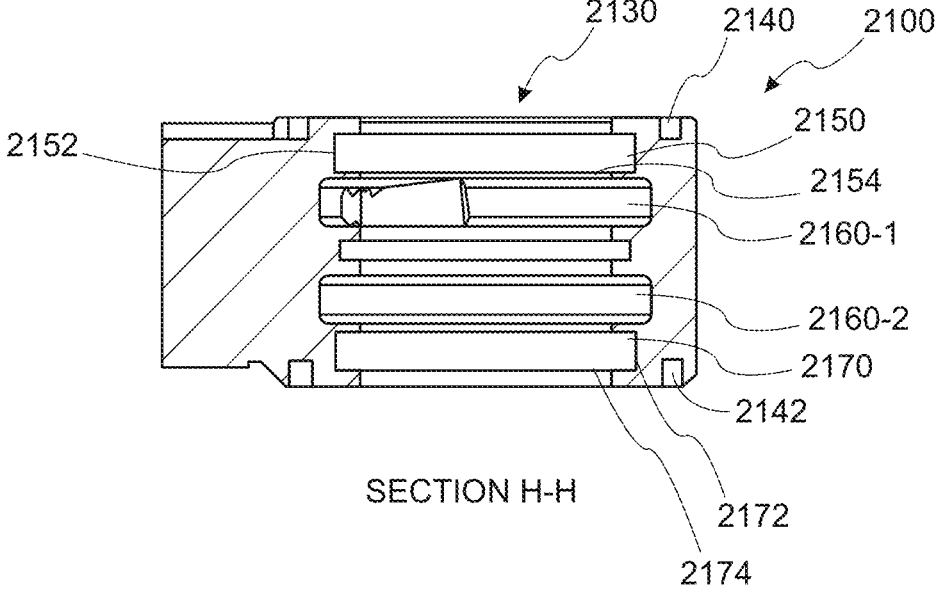

FIG. 4A is a perspective view of a pin swivel 2000 in accordance with an example embodiment of the invention. FIGS. 4B-4H show a top view, a front view, a bottom view, a left side view, a right side view, a back side view, and an exploded view of the pin swivel 2000. FIG. 4I is another front view of the pin swivel 1000 with various section lines. FIG. 4J is a cross-section view of the pin swivel 2000 taken along section line A-A of FIG. 4I. FIG. 4K is a cross-section view of the pin swivel 2000 taken along section line B-B of FIG. 4I. FIG. 4L is a cross-section view of the pin swivel 2000 taken along section line C-C of FIG. 4I. As shown in FIGS. 4A-4L, the pin swivel 2000 may include various elements including a housing 2100, a spool 2200, a spool head 2250 wear bands 2300, U Cup Seals 2400, back up rings 2500, rotary pressure seals 2550, O-rings 2600, fasteners 2700, fasteners 2800, and a mounting plate 2900. The pin swivel 2000 may include additional elements such as, but not limited to, one or more port plugs 2900 which may be used to reinforce one or more ports when the pin swivel 2000 is shipped. As will be shortly explained, housing 2100, spool 2200, and spool head 2250 may have channels and recesses in fluid communication with one another so that a fluid, for example, a gas or a liquid, can flow into the housing 2100 via the spool 2200 and spool head 2250 or from the housing 2100 and into the spool 2200 and spool head 2250. As will also be explained the housing 2100 is rotationally attached to the spool 2200 and the spool head 2250 so the housing 2100 can swivel with respect to the spool 2200 and spool head 2250 (while still allowing fluid to flow from the spool 2200 and spool head 2250 into the housing 2100 or from the housing 2100 into the spool 2200 and spool head 2250).

FIGS. 5A-5E show various views of the housing 2100. More specifically, FIGS. 5A-5E show a perspective view, a top view, a front view, a first cross-section view taken through section line JJ of FIG. 5C, a second cross-section view taken through section line H-H of FIG. 5C. As in the previous example embodiments, the housing 2100 may have a receiving area 2130 therein to accommodate the spool 2200, the U Cup seals 2400, the back up rings 2500, and the rotary pressure seal 2550 as well as facilitate fluid flow between the housing 2100 and the spool 2200. Additionally, the housing 2100 may include a couple of grooves to receive the wear bands. For example, the housing 2100 may include a first groove 2140 arranged at one end of the housing 2100 to receive one wear band 2300 and a second groove 2142 arranged at another rend of the housing 2100 to receive a second wear band 2300.

In example embodiments, the receiving area 2130 may include a first area 2150 having a cylindrical wall 2152 and a floor 2154 wherein the cylindrical wall 2152 has a diameter about the same size as a U cup seal 2400, a back up ring 2500, and a rotary pressure seal 2550 to allow the U cup seal 2400, back up ring 2500, and rotary pressure seal 2550 to reside therein. In example embodiments, the receiving area 2130 may include a second area 2170 having a cylindrical wall 2172 and a floor 2174 wherein the cylindrical wall 2172 has a diameter about the same size as a U cup seal 2400, a back up ring 2500, and a rotary pressure seal 2550 to allow the U cup seal 2400, the back up ring 2500, and the rotary pressure seal 2550 to reside therein.

In addition to the above, the housing 2100 may include two fluid transfer areas 2160-1 and 2160-2 which may be in fluid communication with ports 2110-1 and 2110-2 which may be arranged in the housing 2100. The ports 2110-1 and 2110-2 may allow attachment of a conventional connectors to the housing 2100. As will be explained shortly, a barrel 2220 of the spool 2200 may insert into the housing 2100 and the barrel 2220 may have fluid communication channels which allow fluid (for example, air of liquid) to flow into fluid transfer areas 2160-1 and 2160-2 from the spool 2200 or receive fluid from the fluid transfer areas 2160-1 and 2160-2. In this nonlimiting example embodiment a channel connects port 2110-1 to fluid transfer area 2160-1 and another channel connects port 2110-2 to fluid transfer area 2160-2. Due to the independent channels and do to the fact the channels interface with different fluid transfer areas 2160-1 and 2160-2 there is no fluid mixing between fluids passing through the first and second ports 2110-1 and 2110-2.

Figure 6A:
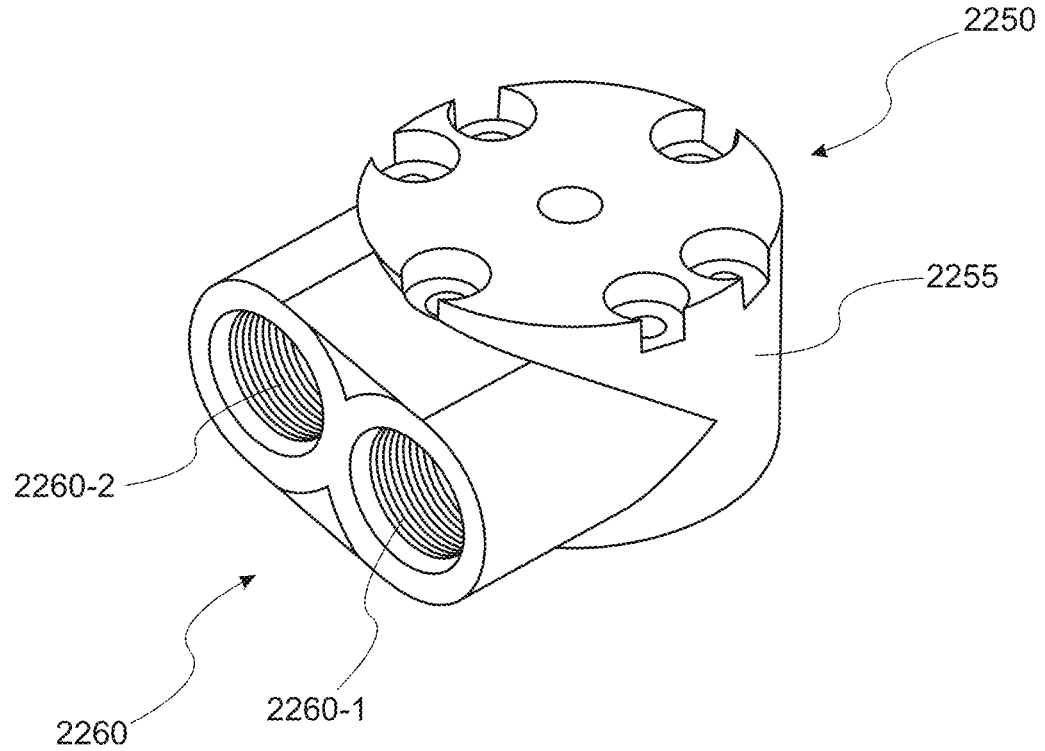
FIGS. 6A-6E are views of a spool head in accordance with example embodiments.
Figure 6B:
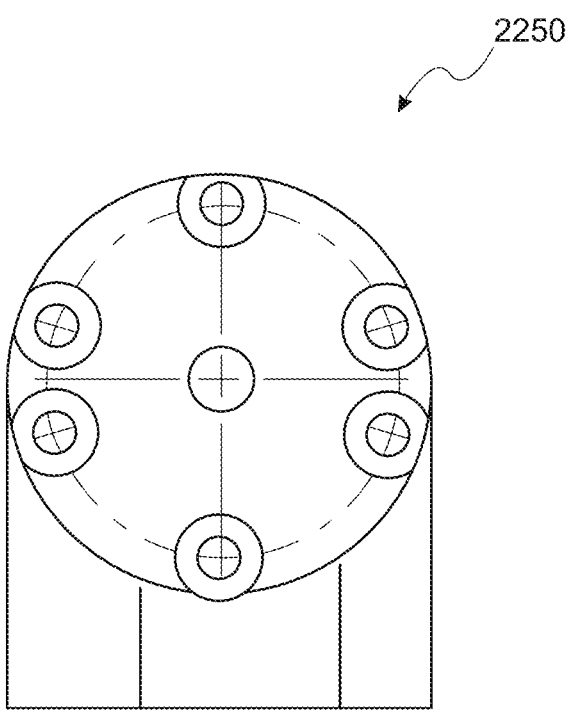
Figure 6C:
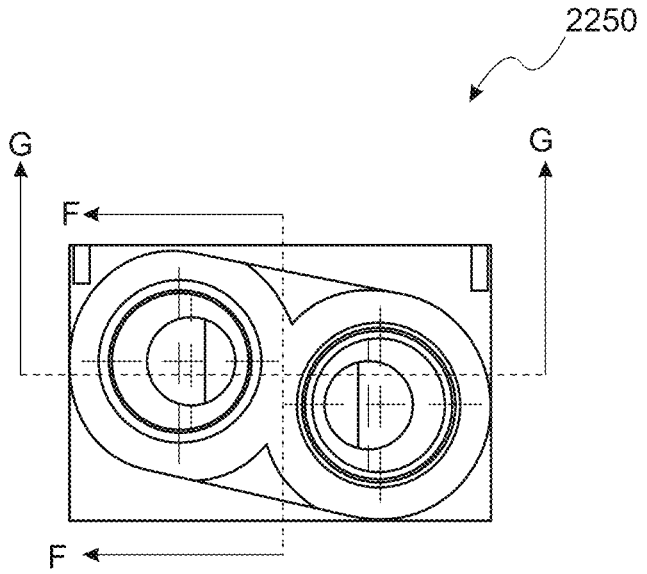
Figure 6D:
Figure 6D:
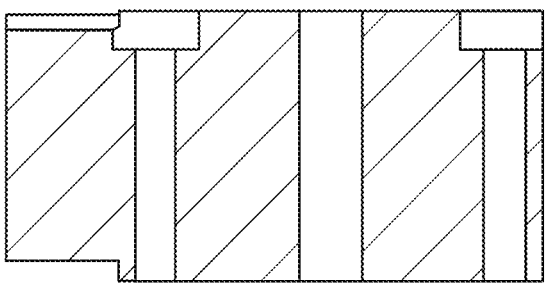
Figure 6E:
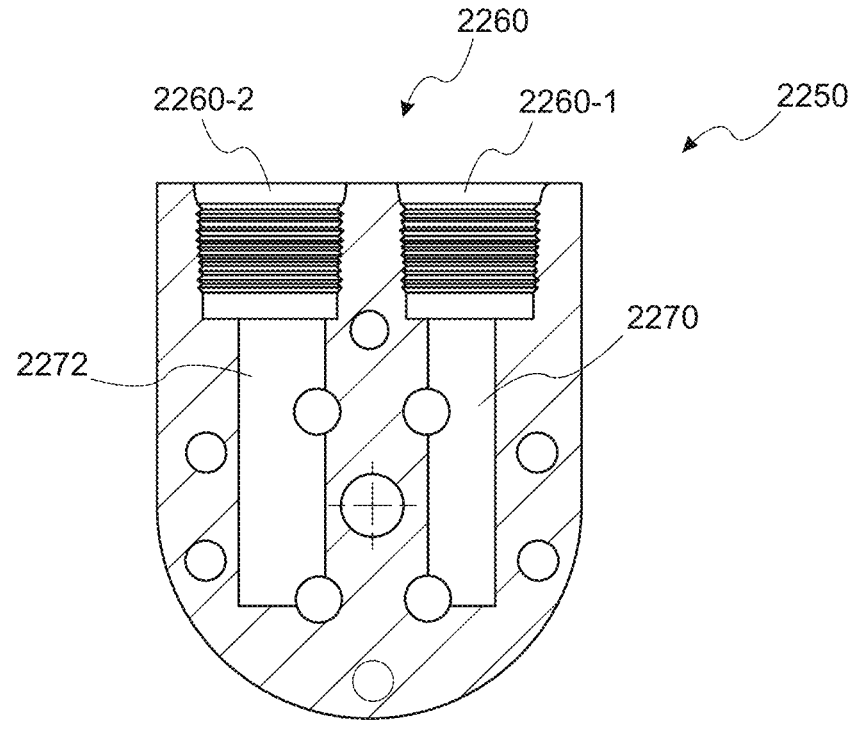
Figure 7A:
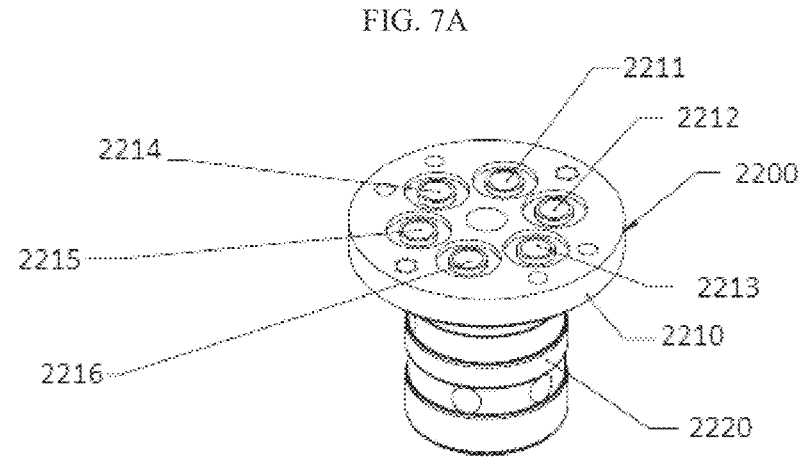
FIGS. 7A-7D are views of a spool in accordance with example embodiments.
Figure 7B:
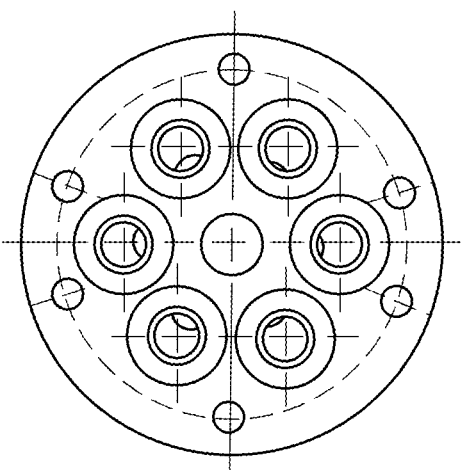
Figure 7C:
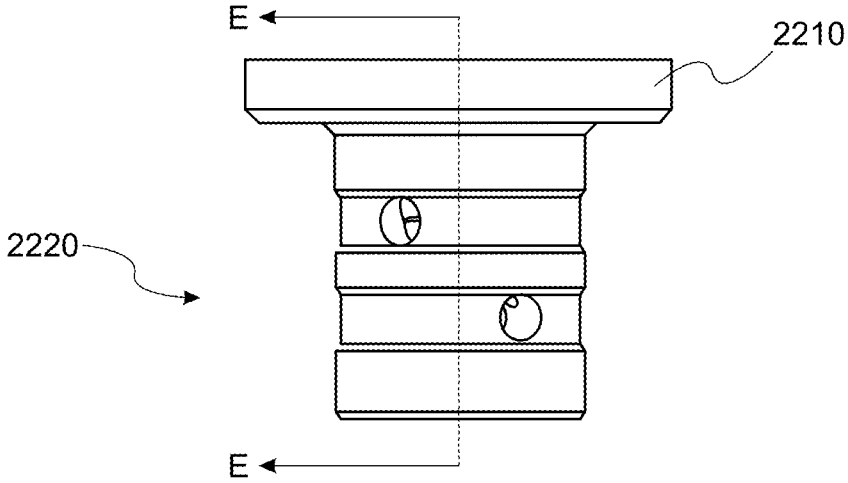
Figure 7D:
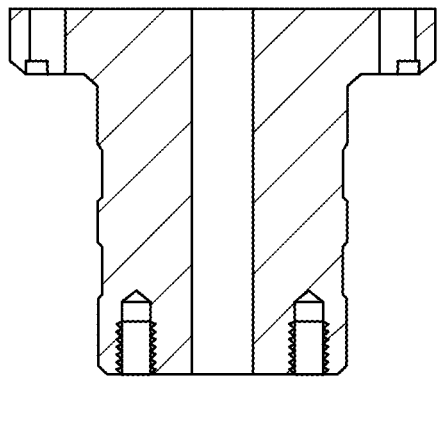

FIGS. 6A-6E are various views of a spool head 2250 in accordance with example embodiments. More specifically, FIGS. 6A-6E show a perspective view of the spool head 2250, a top view of the spool head 2250, a side view of the spool head 2250, a section view of the spool head 2250 (along section Line F-F of FIG. 6C) and a section view of the spool head 2250 (along section line G-G of FIG. 6C). As shown in FIGS. 6A-6E the spool head 2250 may have a main body 2255. A pair of ports 2260 are arranged at a side of the main body 2255 may be arranged side-by-side, however, in order to preserve space and reduce the size of the spoolhead 2250, the ports 2260 are somewhat offset from each other as shown in at least FIG. 6C. The ports 2260 lead to channels within the spool head 2250 which exit a bottom of the spool head 2250. For example, port 2260-1 is in fluid communication with a first channel 2270 which extends into the body 2255 of the spool head 2250. The first channel 2270 in turn is in fluid communication with channels that run vertically through the body and exit the body 2250 at a surface that faces the spool 2200. Similarly, port 2260-2 is in fluid communication with a second channel 2272 which extends into the body 2255 of the spool head 2250. The second channel 2270 in turn is in fluid communication with channels that run vertically through the body and exit the body 2250 at a surface that faces the spool 2200. FIG. 6E shows the first channel 2270 and the second channel 2272 in fluid communication with two vertical channels each (a third not visible in this figure).

FIGS. 7A-7D are views of the spool 2200 in accordance with example embodiments. As shown in FIGS. 7A-7D the spool 2200 includes a head 2210 and a cylindrical barrel 2220 extending from the head 2210. The spool head 2210, in this nonlimiting example embodiment, includes six channels denoted by 2211, 2212, 2213, 2214, 2215, and 2216 which pass through the head 2210 and have exit points in the barrel 2220. Channels 2211, 2212, 2213 receive fluid from the vertical channels associated with the first channel 2270 and channels 2214, 2215, and 2216 receive a fluid from the vertical channels associated with the second channel 2272.

In example embodiments, the barrel 2220 is insertable into the receiving area 2130 of the housing 2100. Further, the barrel 2220 is configured so that as pin swivel 2000 is inserted into the receiving area 2130 exits from channels 2211, 2212, and 2213 align with fluid transfer area 2160-2 and the exits of channels 2214, 2215, and 2216 align with the fluid transfer area 2160-1. In this manner, due to the channels formed in each of the spool head 2250 and spool 2200 fluid communication between the ports of the spool head 2250 and ports of the housing 2100 is possible.

So far as connecting the various elements together, the spool head 2250 includes a plurality of channels through which the plurality of fasteners 2700 may pass. Threaded ends of the plurality of fasteners 2700 may engage threaded apertures that may be on a surface of the spool 2200 that faces the spool head 2250. In this way, the spool head 2250 may be connected to the spool 2200. The mounting plate 2900 may be connected to the underside of the spool 2200 via the fasteners 800 which may pass through the mounting plate 2900 and into threaded apertures that may be present in a surface of the spool 2200 that faces the bracket 2900. In this way, the spool head 2250, spool 2000, and bracket 2900 may form a substantially rigid structure and the housing 2100 may be free to swivel about the barrel 2220.

In example embodiments the backup rings 2500 may resemble an annulus having an inside diameter about the same as, or slightly larger than, the diameter of the barrel 2220. Similarly, the U-cup seals 2400 may resemble an annulus having an inside diameter about the same as, or slightly larger than, the diameter of the barrel 2220. However, the invention is not limited thereto as the inside diameters of the U-Cup seals 2400 and the backup rings 2500 may be slightly smaller than diameter of the barrel 2220 when the U-Cup seals 2400 and backup rings 2500 are comprised of a resilient material. In example embodiments a section of the U-cup seals 2400 may be U-shaped whereas a section of the backup rings 2500 may be somewhat rectangular. Exemplary suitable materials for the back rings 2500 and U-cup seals 2400 are POM and urethane. The rotary seal pressure seal may be made from any suitable material including, but not limited to, PTFE and Buna-N. As for the housing 2100, the spool 2200, and the spool head 2250 one skilled in the art would recognize a number of suitable materials, however, without intending to limit the invention, ductile iron has been found to work well. As for the wear bands 300, one skilled in the art would recognize a number of suitable materials, however, without intending to limit the invention, glass-filled nylon plastic has been found to work well.

Figure 8A:
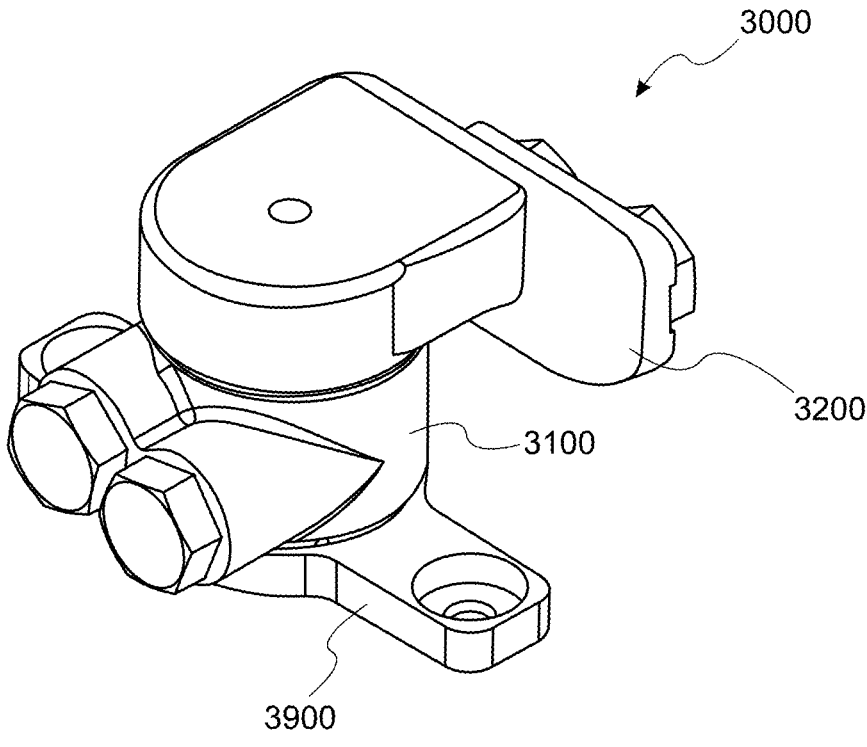
FIGS. 8A-8L are views of a pin swivel in accordance with example embodiments.
Figure 8B:
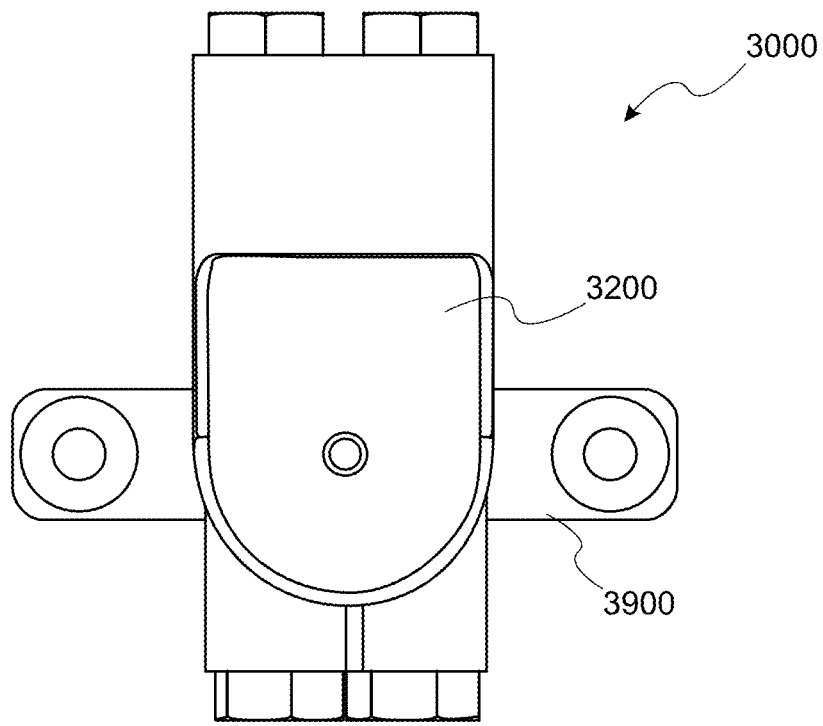
Figure 8C:
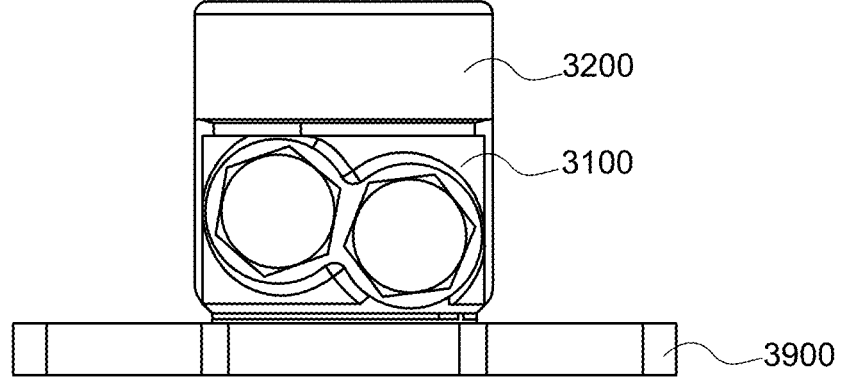
Figure 8D:
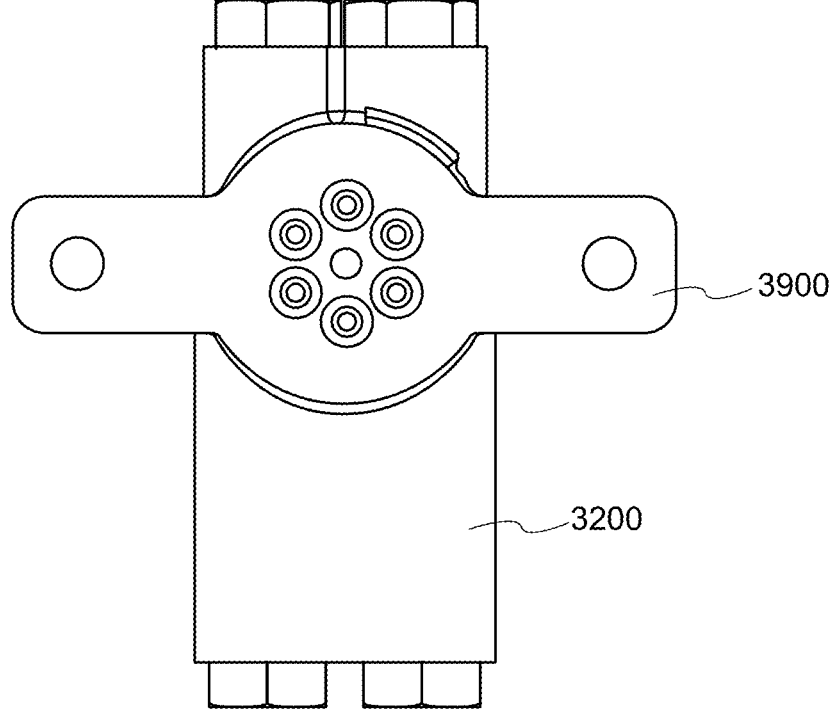
Figure 8E:
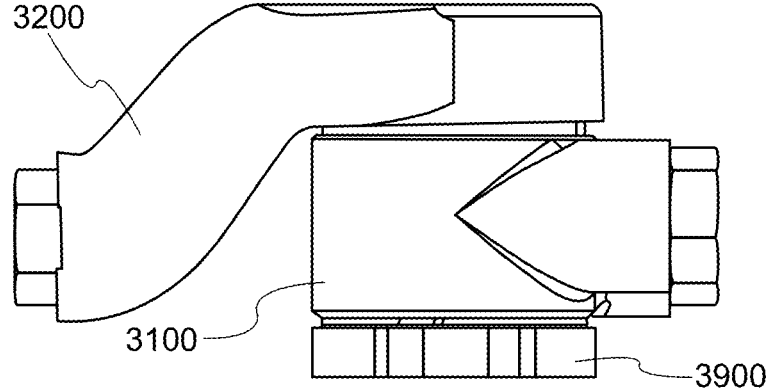
Figure 8F:
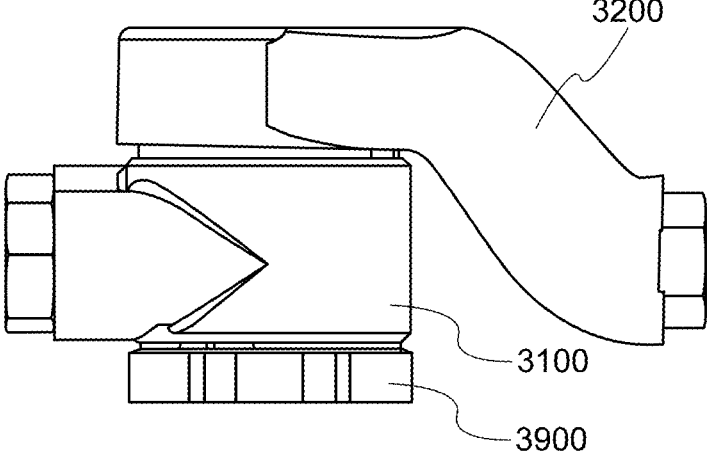
Figure 8G:
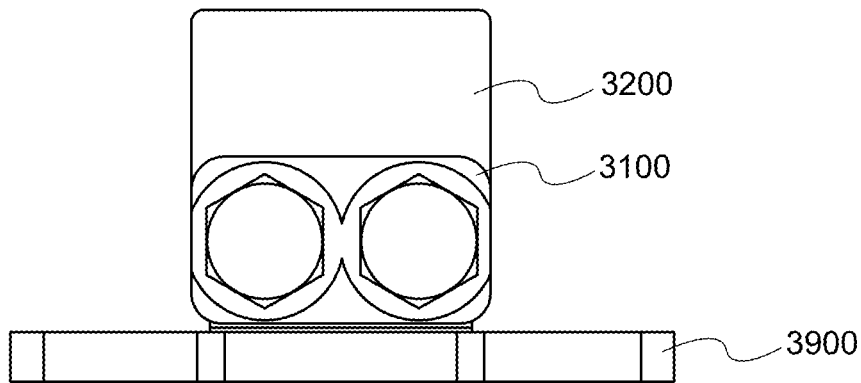
Figure 8H:
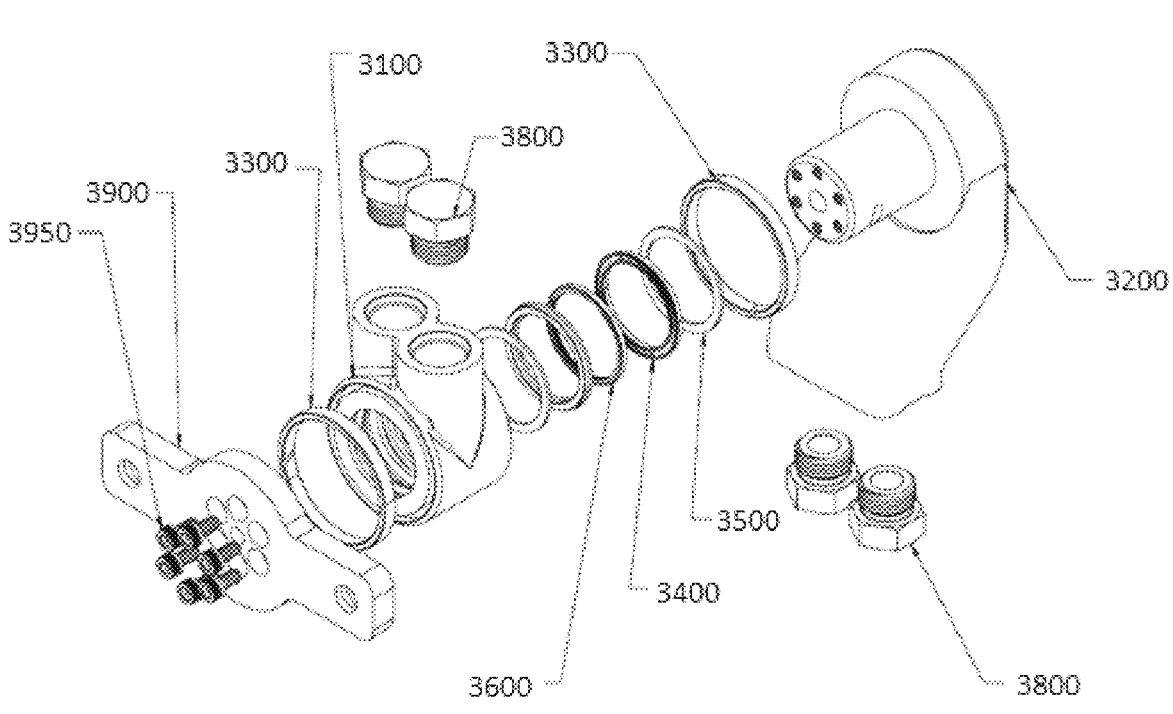
Figure 8I:
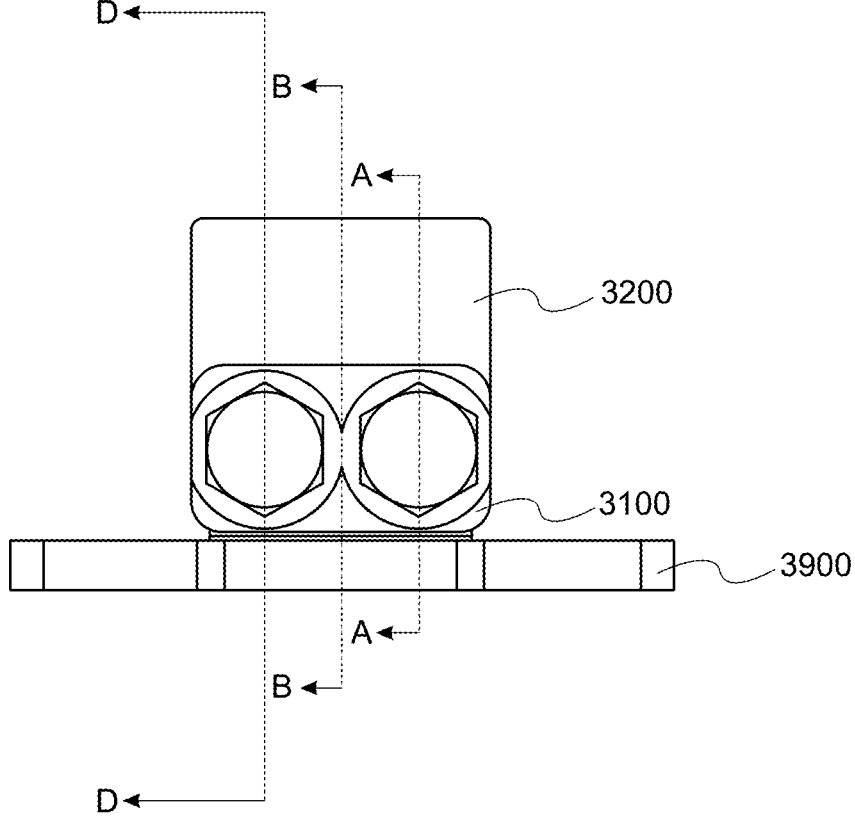
Figure 8J:
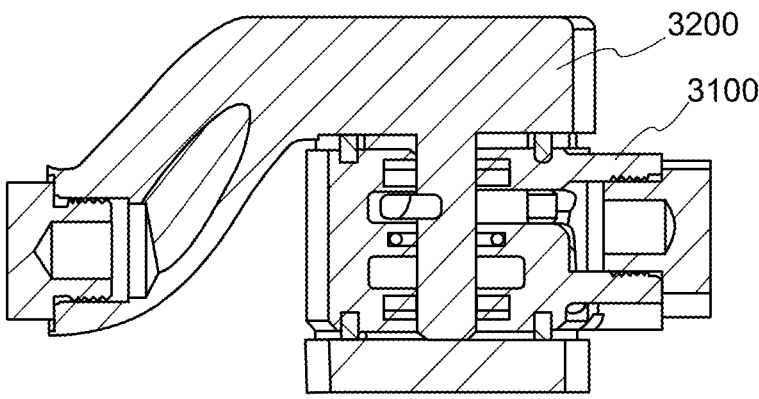
Figure 8K:
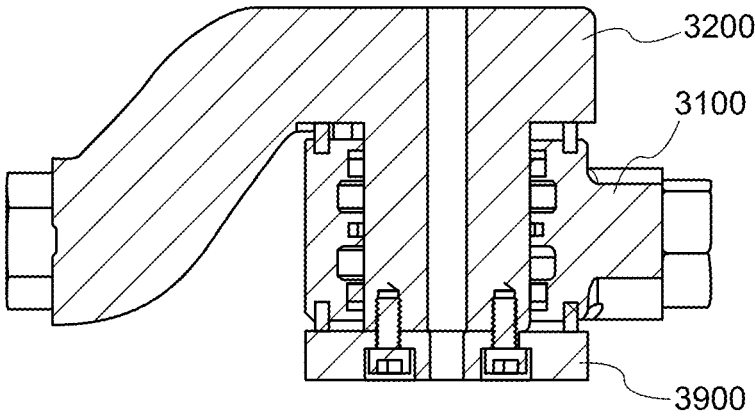
Figure 8L:
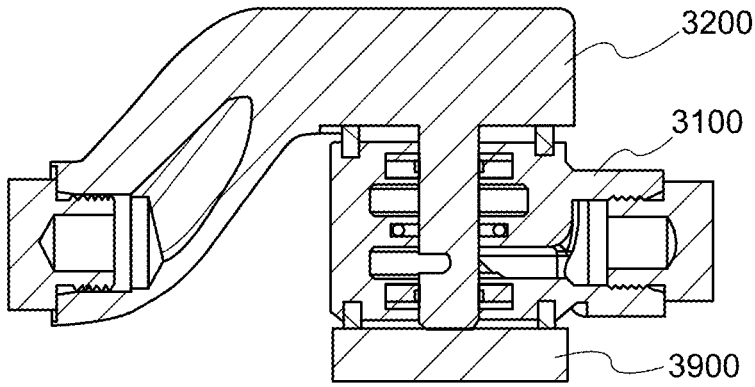

FIG. 8A is a perspective view of a pin swivel 3000 in accordance with an example embodiment of the invention. FIGS. 8B-8L show a top view, a front view, a bottom view, a left side view, a right side view, a back side view, and an exploded view of the pin swivel 3000. FIG. 81 is another front view of the pin swivel 3000 with various section lines. FIG. 8J is a cross-section view of the pin swivel 3000 taken along section line A-A of FIG. 8I. FIG. 8K is a cross-section view of the pin swivel 3000 taken along section line B-B of FIG. 8I. FIG. 8L is a cross-section view of the pin swivel 3000 taken along section line D-D of FIG. 4I. As shown in FIGS. 8A-8L, the pin swivel 3000 may include various elements including a housing 3100, a spool 3200, wear bands 3300, U Cup Seals 3400, back up rings 3500, rotary pressure seals 3600, a mounting plate 3900, and fasteners 3950. The pin swivel 3000 may include additional elements such as, but not limited to, one or more port plugs 3800 which may be used to reinforce one or more ports when the pin swivel 3000 is shipped. As will be shortly explained, housing 3100, and spool 3200 may have channels and recesses in fluid communication with one another so that a fluid, for example, a gas or a liquid, can flow into the housing 3100 via the spool 3200 or from the housing 3100 and into the spool 3200. As will also be explained the housing 3100 is rotationally attached to the spool 3200 so the housing 3100 can swivel with respect to the spool 3200 (while still allowing fluid to flow from the spool 3200 into the housing 3100 or from the housing 3100 into the spool 3200).

Figure 9A:
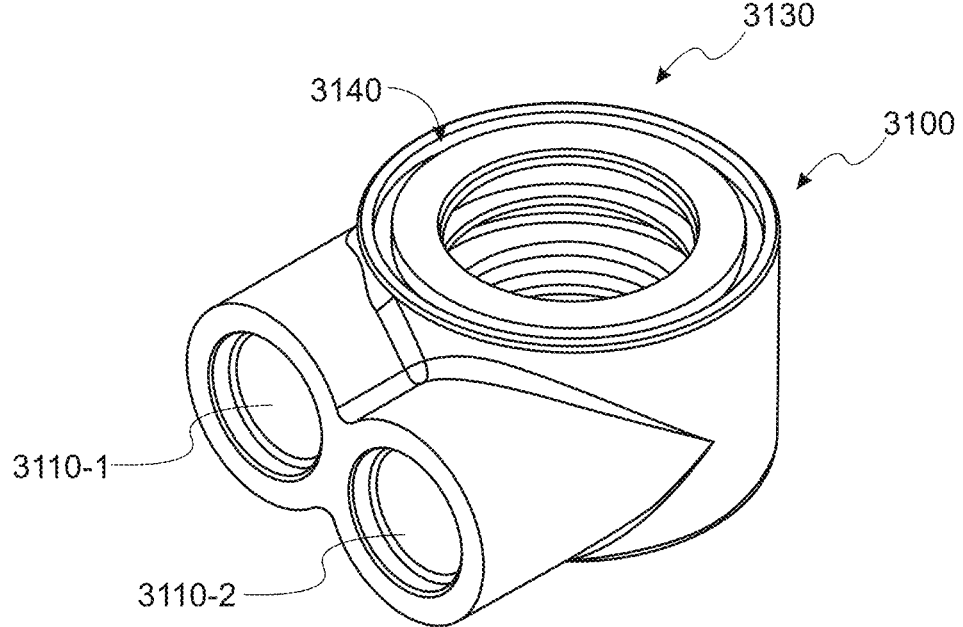
FIGS. 9A-9J are views of a housing in accordance with example embodiments.
Figure 9B:
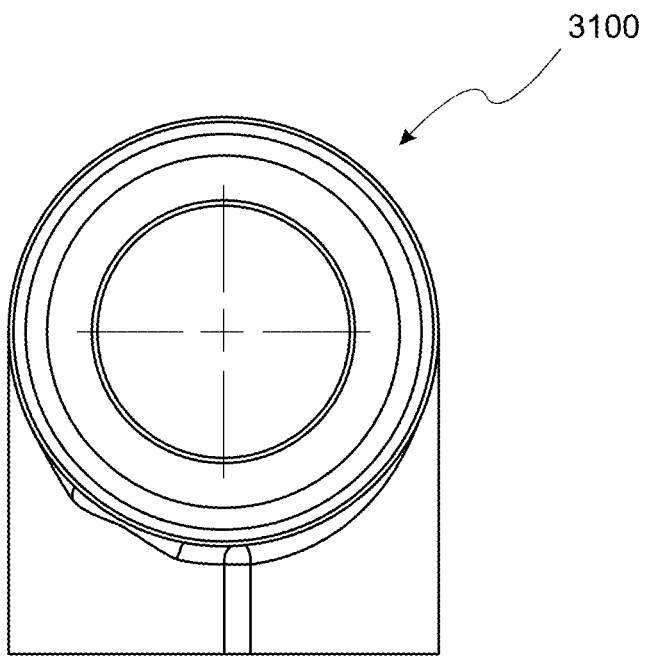
Figure 9C:
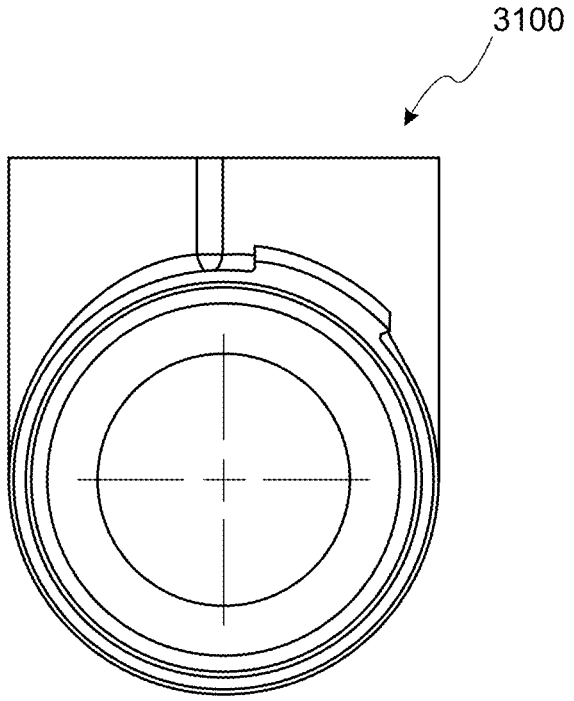
Figure 9D:
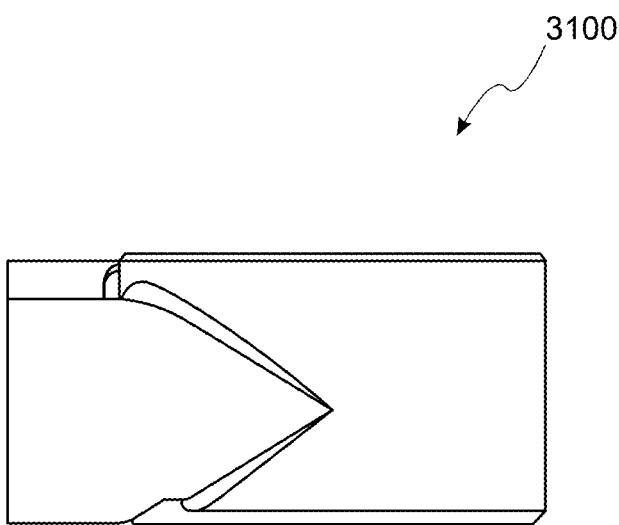
Figure 9E:
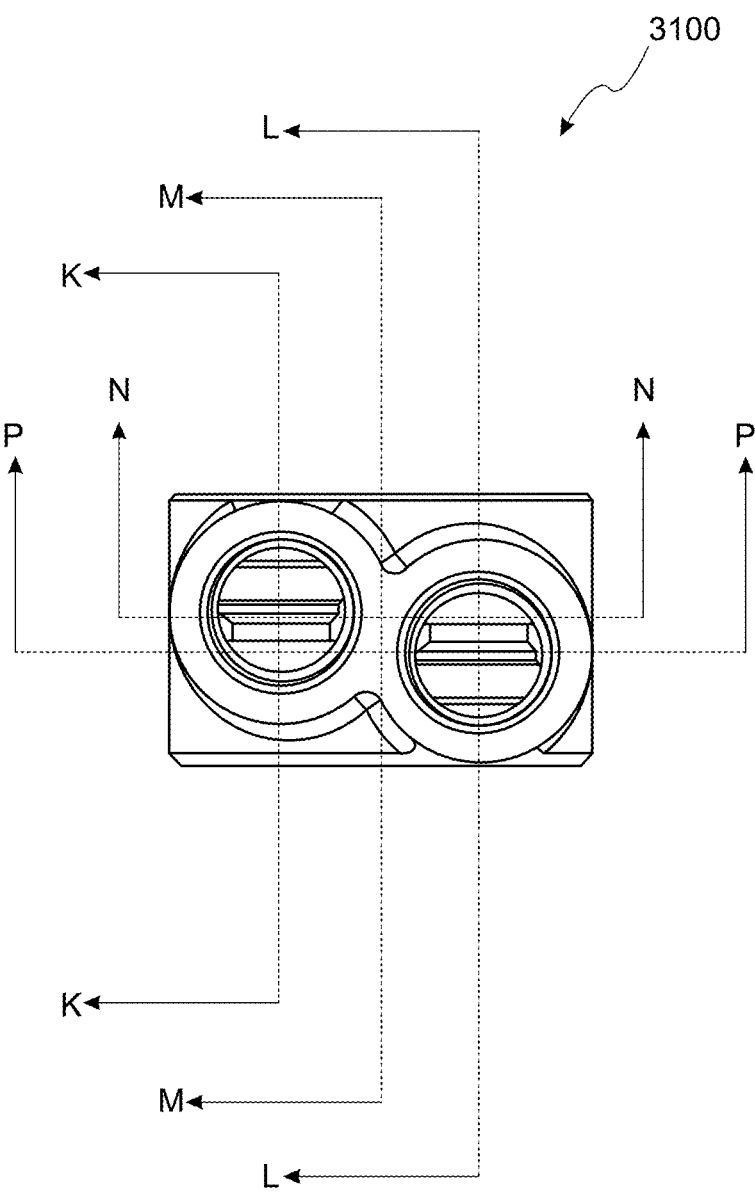
Figure 9F:
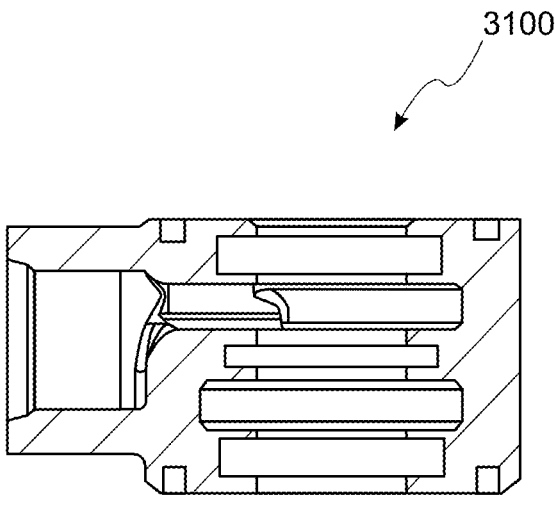
Figure 9G:
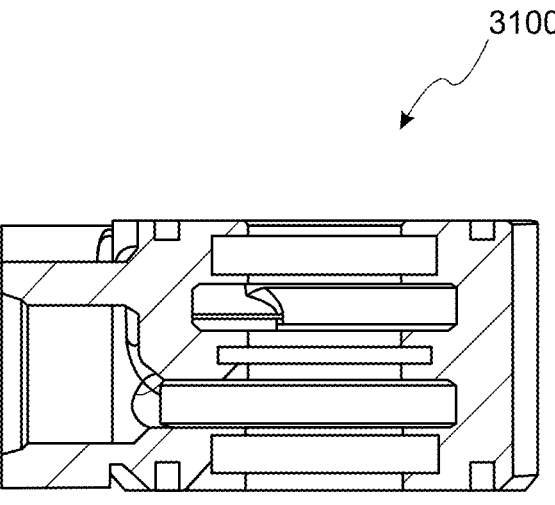
Figure 9H:
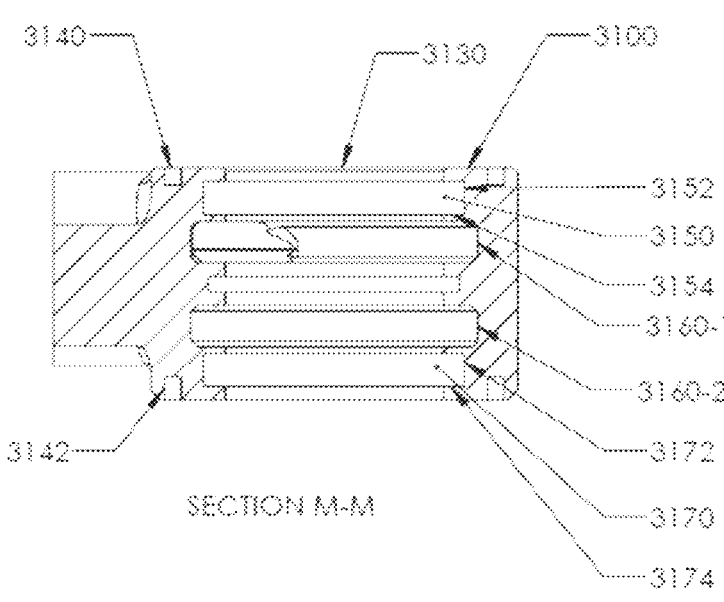
Figure 9I:
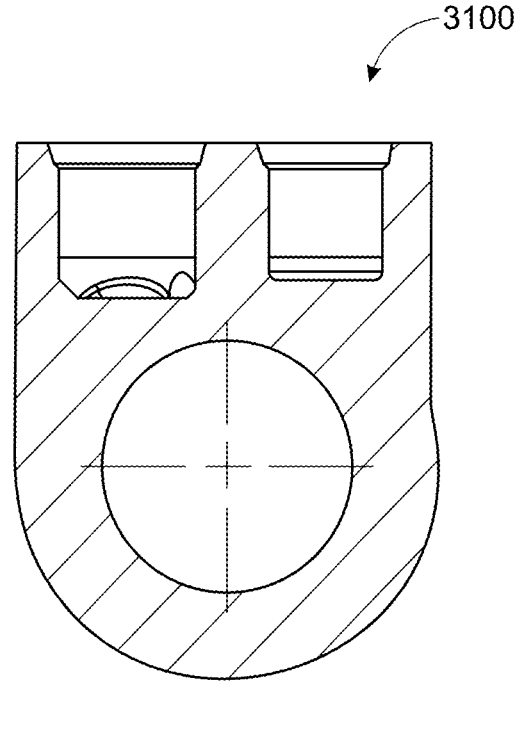
Figure 9J:
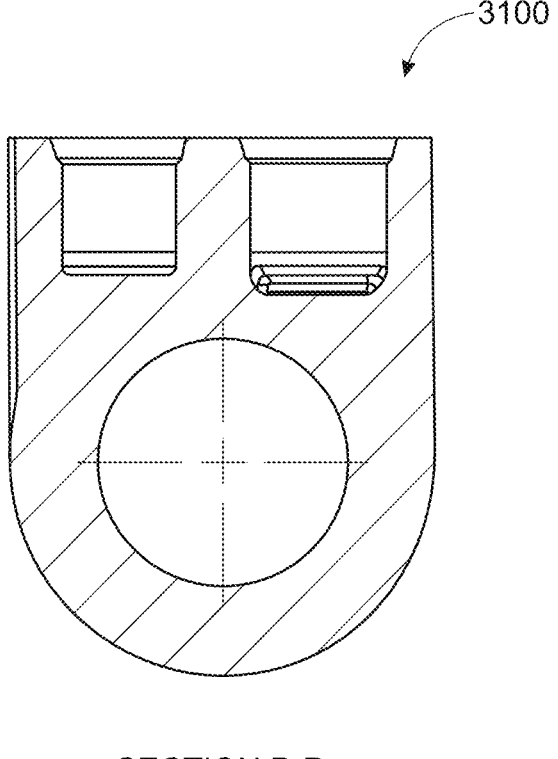

FIGS. 9A-9J show various views of the housing 3100. More specifically, FIGS. 9A-9D show a perspective view, a top view, a bottom view, and a side view of the housing 3100. FIG. 9E is another side view of the housing 3100 having various section lines. FIG. 9F is a first cross-section view taken through section line KK of FIG. 9E. FIG. 9G is a second cross-section view taken through section line LL of FIG. 9E. FIG. 9H is a third cross-section view taken through section line MM of FIG. 9E. FIG. 9I is a fourth cross-section view taken through section line NN of FIG. 9E. FIG. FIG. 9J is a fifth cross-section view taken through section line MM of FIG. 9E.

As in the previous example embodiments, the housing 3100 may have a receiving area 3130 therein to accommodate the spool 3200, the U Cup seals 3400, the back up rings 3500, and the rotary pressure seal 3600 as well as facilitate fluid flow between the housing 3100 and the spool 3200. Additionally, the housing 3100 may include a couple of grooves to receive the wear bands 3300. For example, the housing 3100 may include a first groove 3140 arranged at one end of the housing 3100 to receive one wear band 2300 and a second groove 3142 arranged at another rend of the housing 3100 to receive a second wear band 3300.

In example embodiments, the receiving area 3130 may include a first area 3150 having a cylindrical wall 3152 and a floor 3154 wherein the cylindrical wall 3152 has a diameter about the same size as a U cup seal 3400, a back up ring 3500, and a rotary pressure seal 3600 to allow the U cup seal 3400, back up ring 3500, and rotary pressure seal 3600 to reside therein. In example embodiments, the receiving area 3130 may include a second area 3170 having a cylindrical wall 3172 and a floor 3174 wherein the cylindrical wall 3172 has a diameter about the same size as a U cup seal 3400, a back up ring 3500, and a rotary pressure seal 3600 to allow the U cup seal 3400, the back up ring 3500, and the rotary pressure seal 3550 to reside therein.

In addition to the above, the housing 3100 may include two fluid transfer areas 3160-1 and 3160-2 which may be in fluid communication with a port 3110-1 and 3110-2 which may be arranged in the housing 3100. The ports 3110-1 and 3110-2 may allow attachment of a conventional connectors to the housing 3100. As will be explained shortly, a barrel 3250 of the spool 3200 may insert into the housing 3100 and the barrel 3250 may have fluid communication channels which allow fluid (for example, air or liquid) to flow into fluid transfer areas 3160-1 and 3160-2 from the spool 3200 or receive fluid from the fluid transfer areas 3160-1 and 3160-2. In this nonlimiting example embodiment a channel connects port 3110-1 to fluid transfer area 3160-1 and another channel connects port 3110-2 to fluid transfer area 3160-2. Due to the independent channels and do to the fact the channels interface with different fluid transfer areas 3160-1 and 3160-2 there is no fluid mixing between fluids passing through the first and second ports 3110-1 and 3110-2.

Figure 10A:
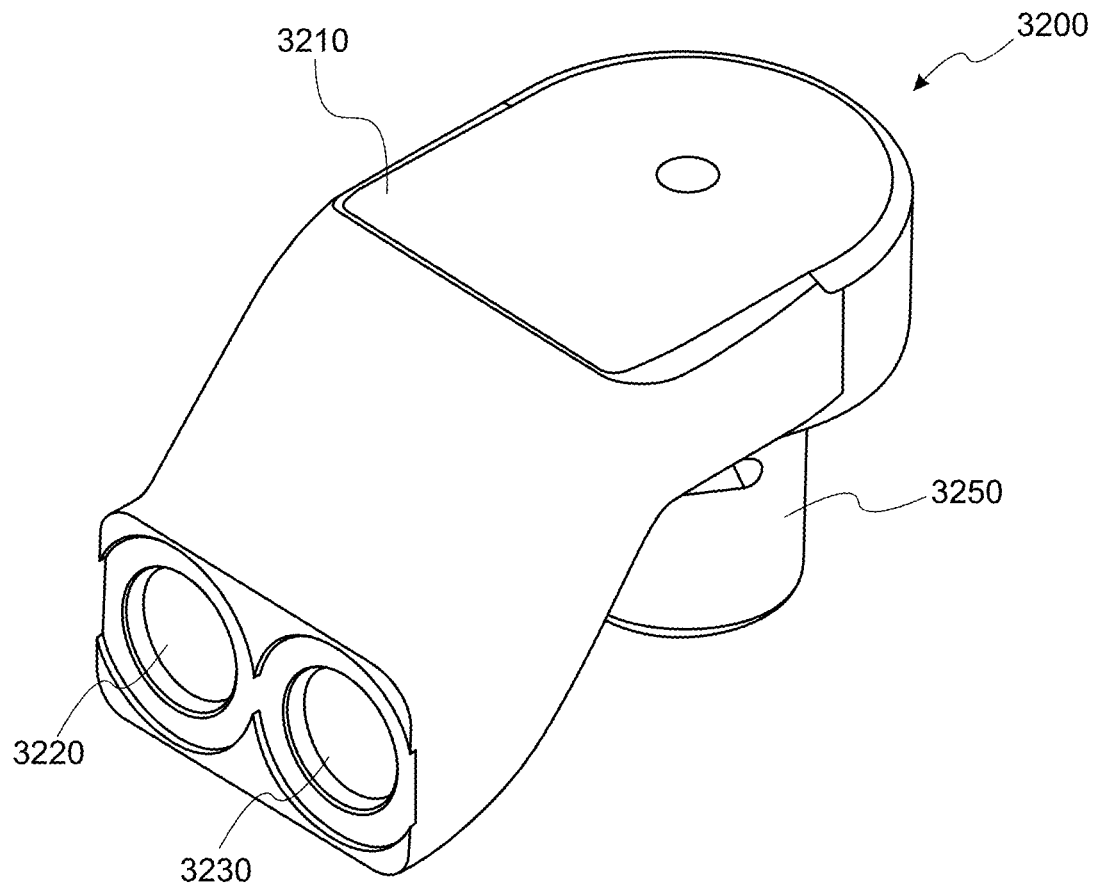
FIGS. 10A-10M and 10O-10P are views of a spool in accordance with example embodiments.
Figure 10B:
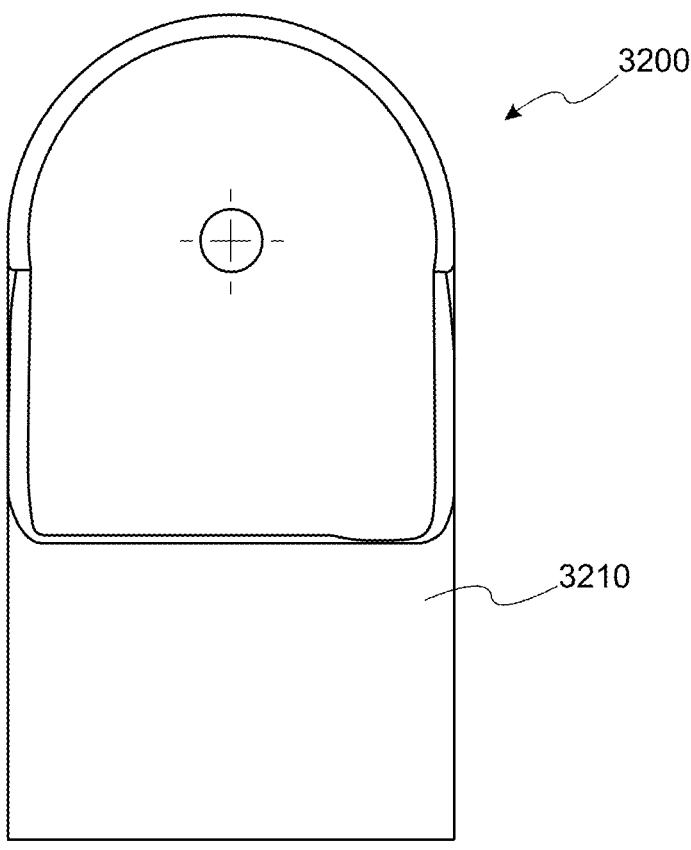
Figure 10C:
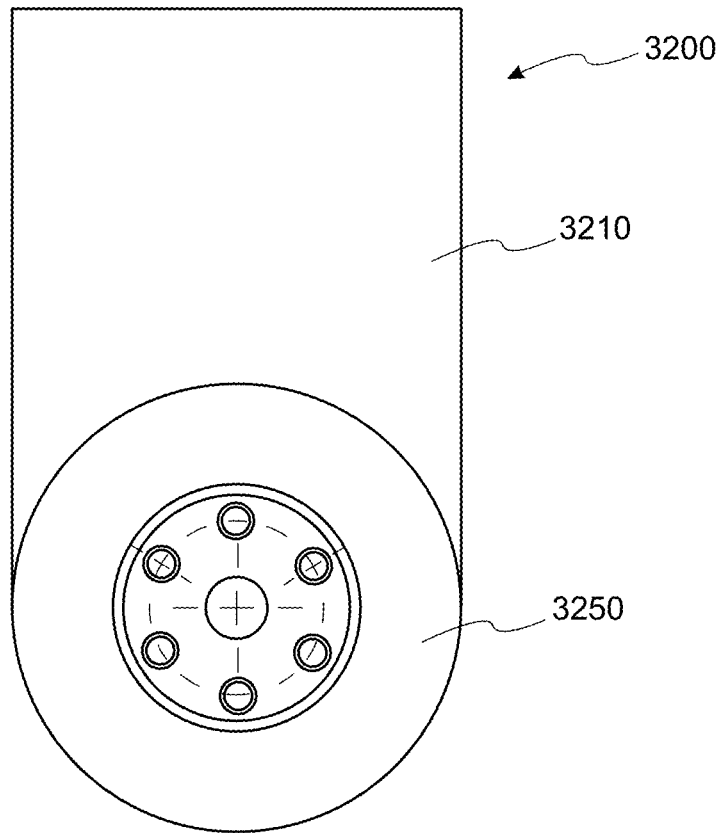
Figure 10D:
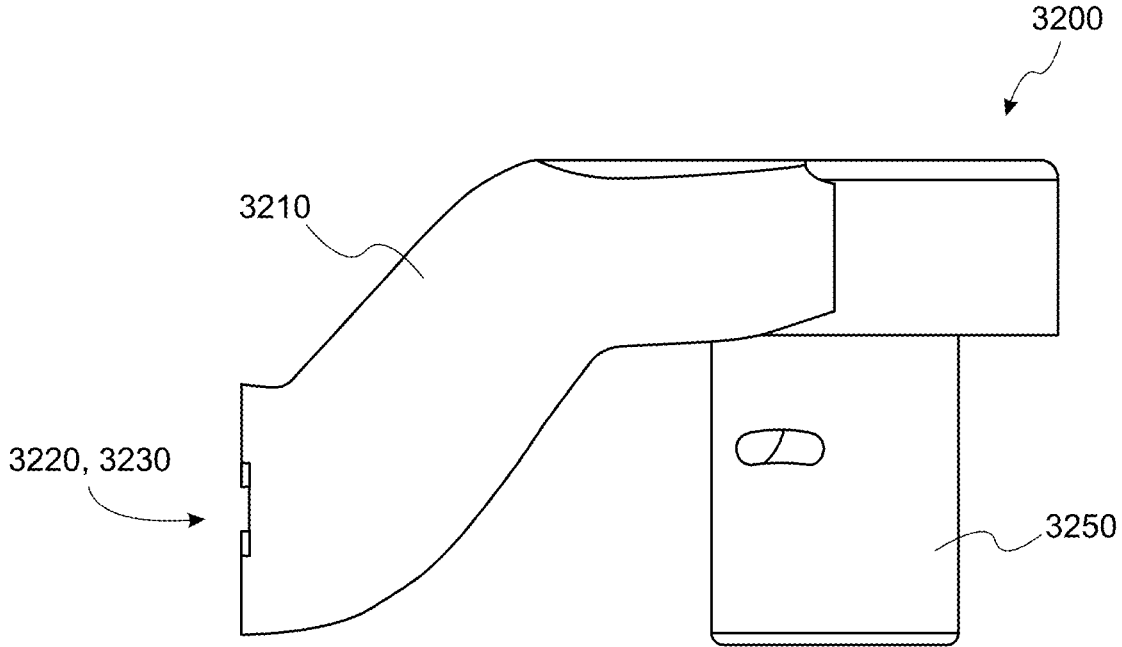
Figure 10E:
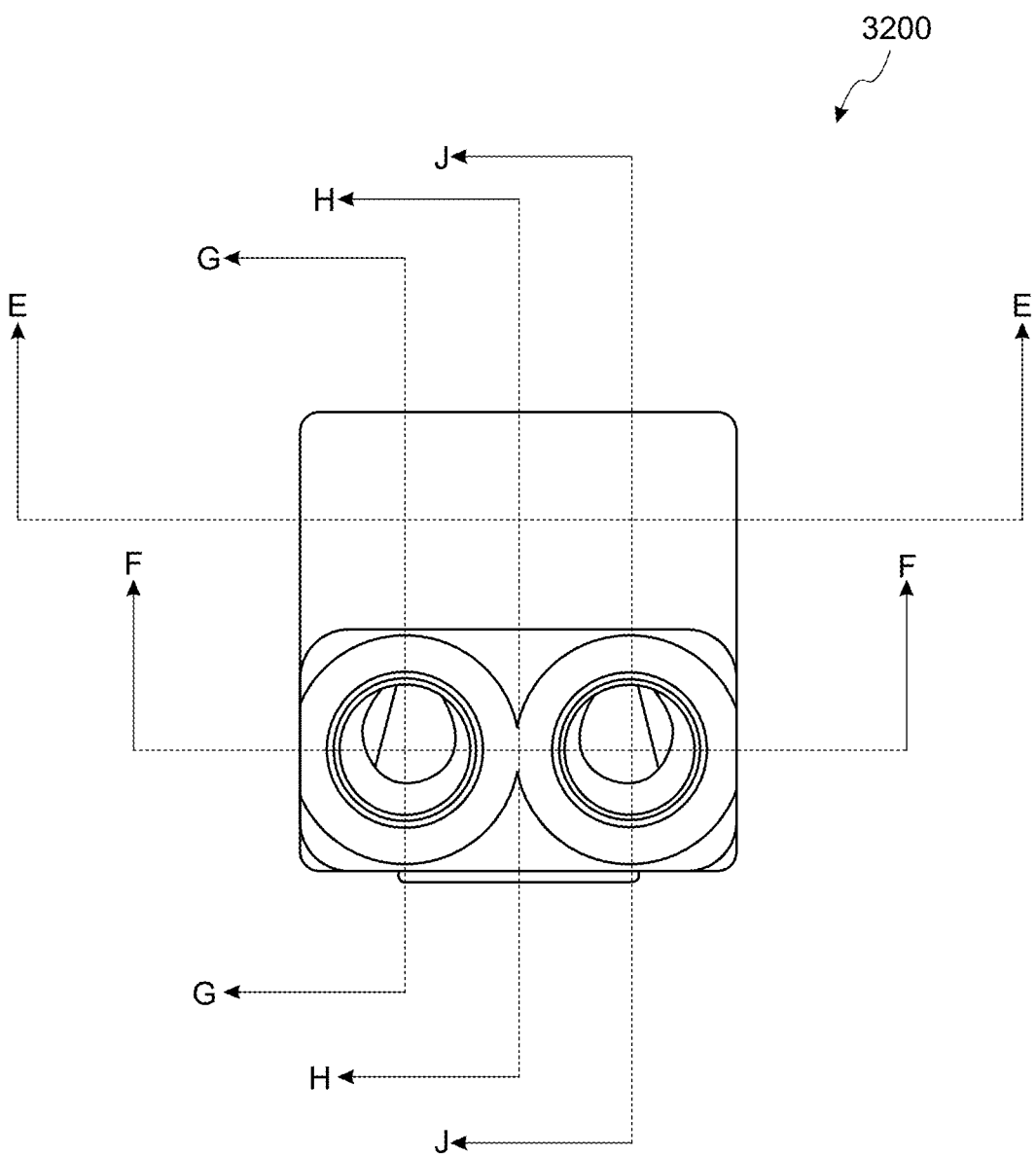
Figure 10F:
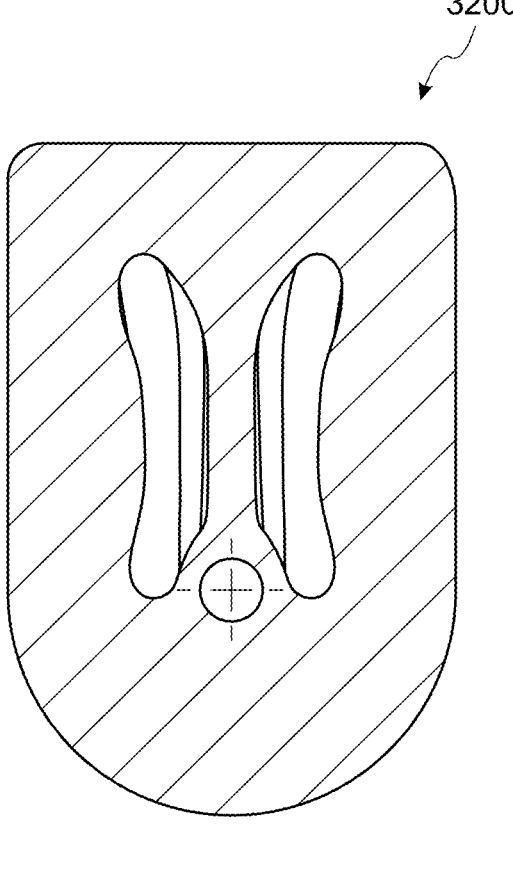
Figure 10G:
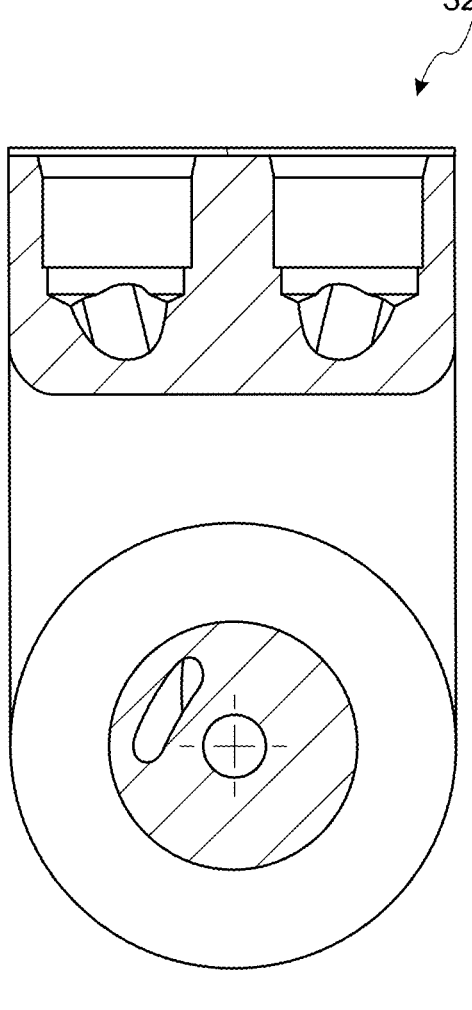
Figure 10H:
Figure 10H:
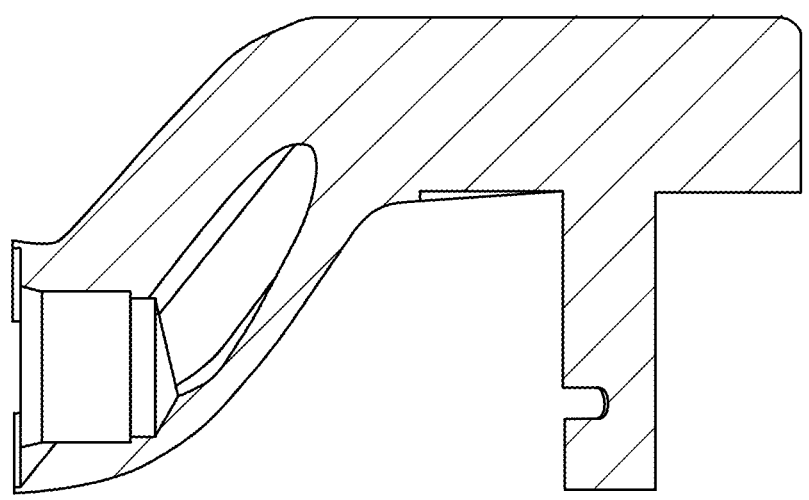
Figure 10I:
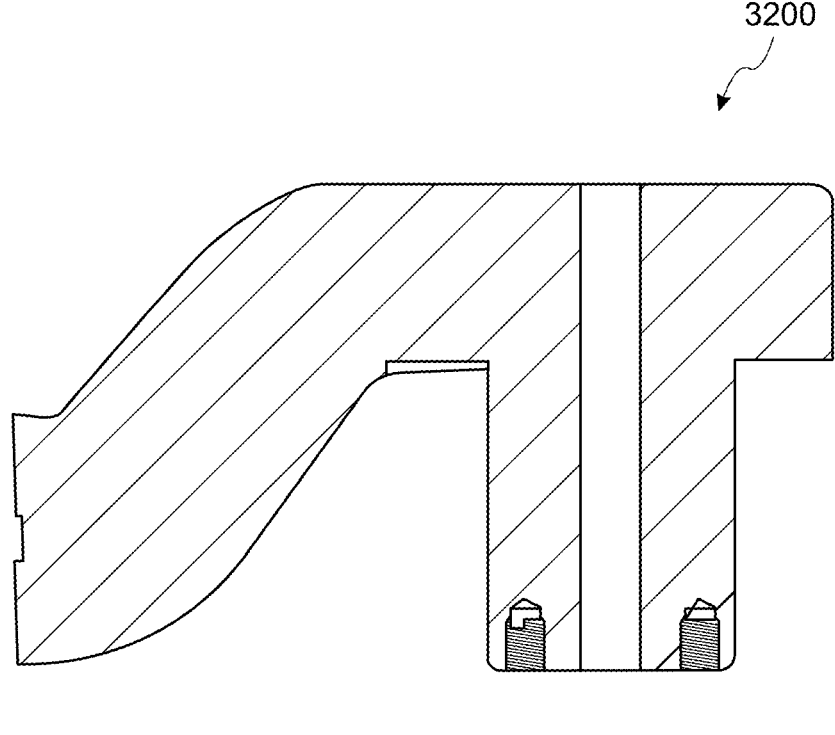
Figure 10J:
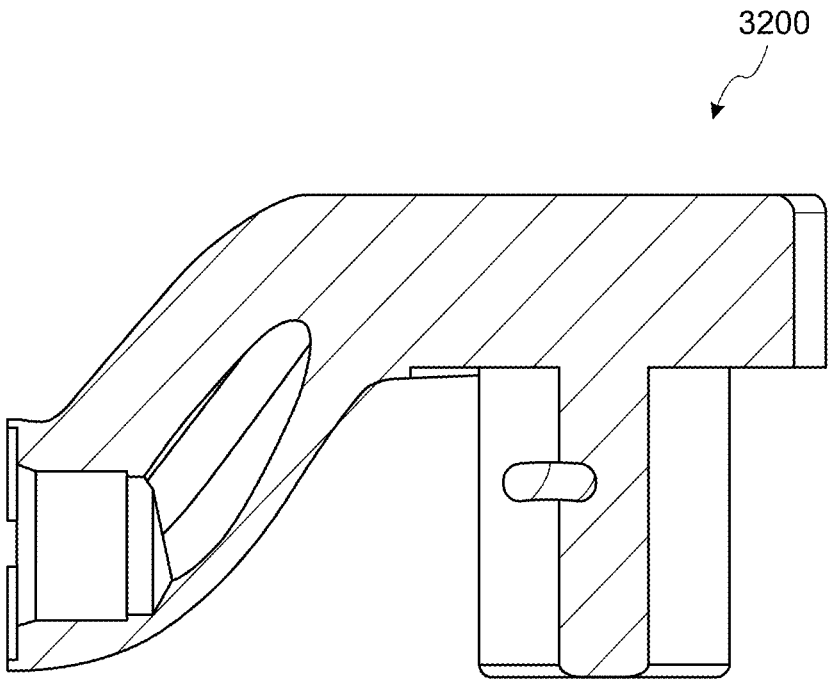
Figure 10K:
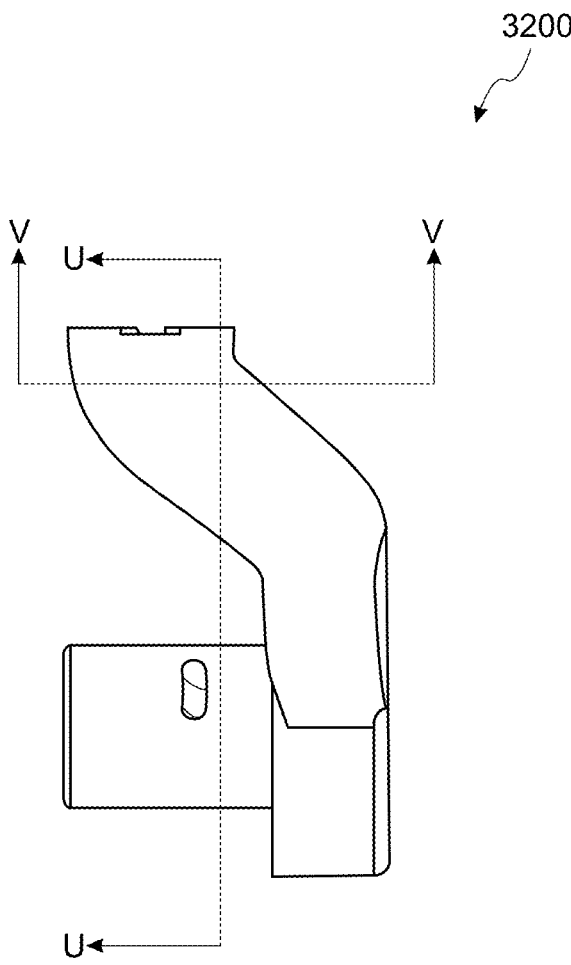
Figure 10L:
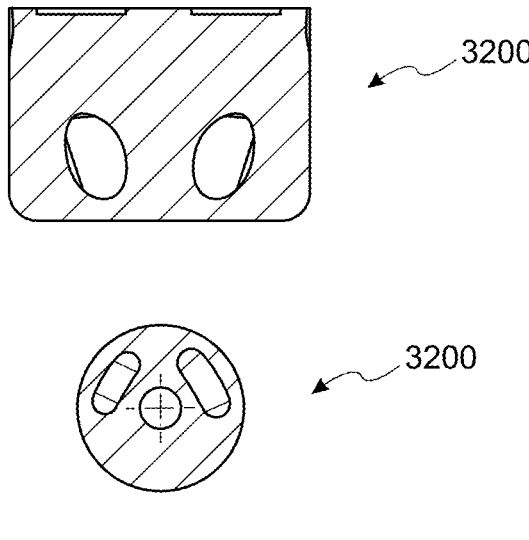
Figure 10M:
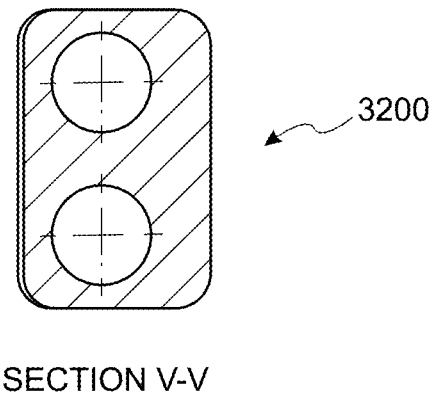

FIGS. 10A-10M are various views of a spool 2200 in accordance with example embodiments. More specifically, FIGS. 10A-10E show a perspective view of the spool 3200, a top view of the spool 3200, a bottom view of the spool 3200, a side view of the spool 3200, and a front view of the spool 3200 along with various sections lines. FIGS. 10F-10M show various section views of the spool 3200. FIG. 10F shows a section view taken through section line EE of FIG. 10E. FIG. 10G shows a section view taken through section line FF of FIG. 10E. FIG. 10H shows a section view taken through section line GG of FIG. 10E. FIG. 10I shows a section view taken through section line HH of FIG. 10E. FIG. 10J shows a section view taken through section line JJ of FIG. 10E. FIG. 10K shows a side view of the spool 3200 having section lines UU and VV. FIG. 10L shows a section view taken through section line UU of FIG. 10K. FIG. 10M shows a section view taken through section line VV of FIG. 10K.

As shown in FIGS. 10A-10K the spool 3200 may have a main body 3210 with a pair of ports 3220 and 3230. The pair of ports 3220 and 3230 may be arranged at a side of the main body 2110 and may be arranged side-by-side, however, in order to preserve space and reduce the size of the spool 3200, the ports 3220 and 3230 may be somewhat offset from each other. The ports 3220 and 3230 lead to channels within the main body 3210 which pass through the main body 3210 and into a barrel 3250 of the spool 3200. The channels continue through the barrel 3250 and exit the sides of the barrel at elevations that correspond to the housing 3100's fluid transfer areas 3160-1 and 3160-2.

Figure 10O:
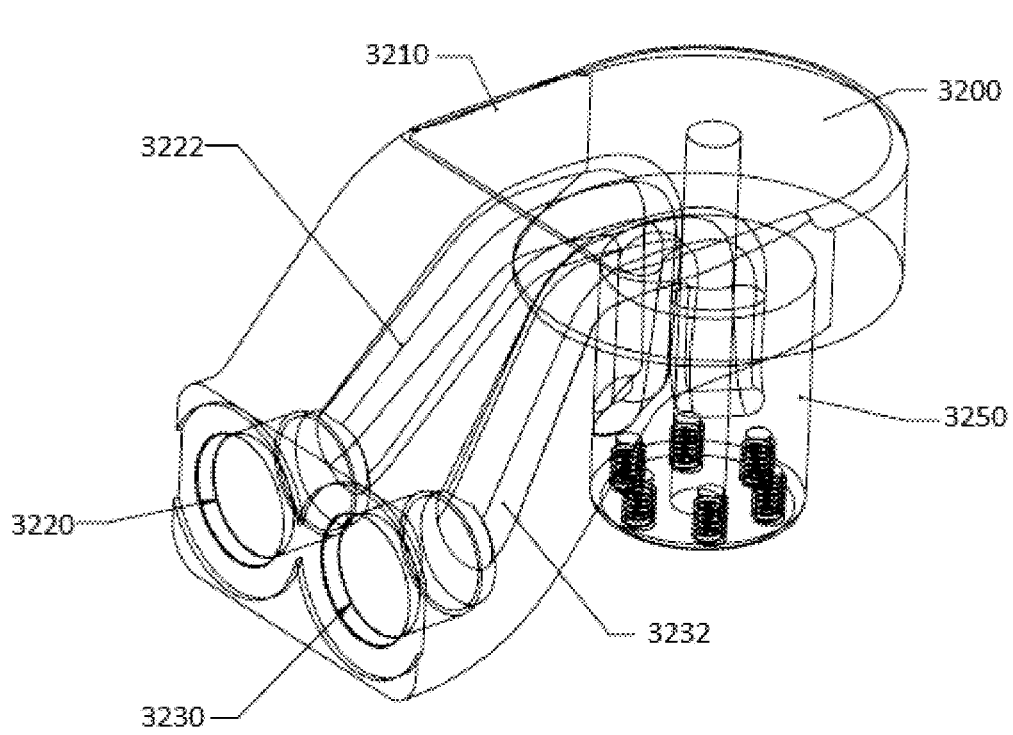
Figure 10P:
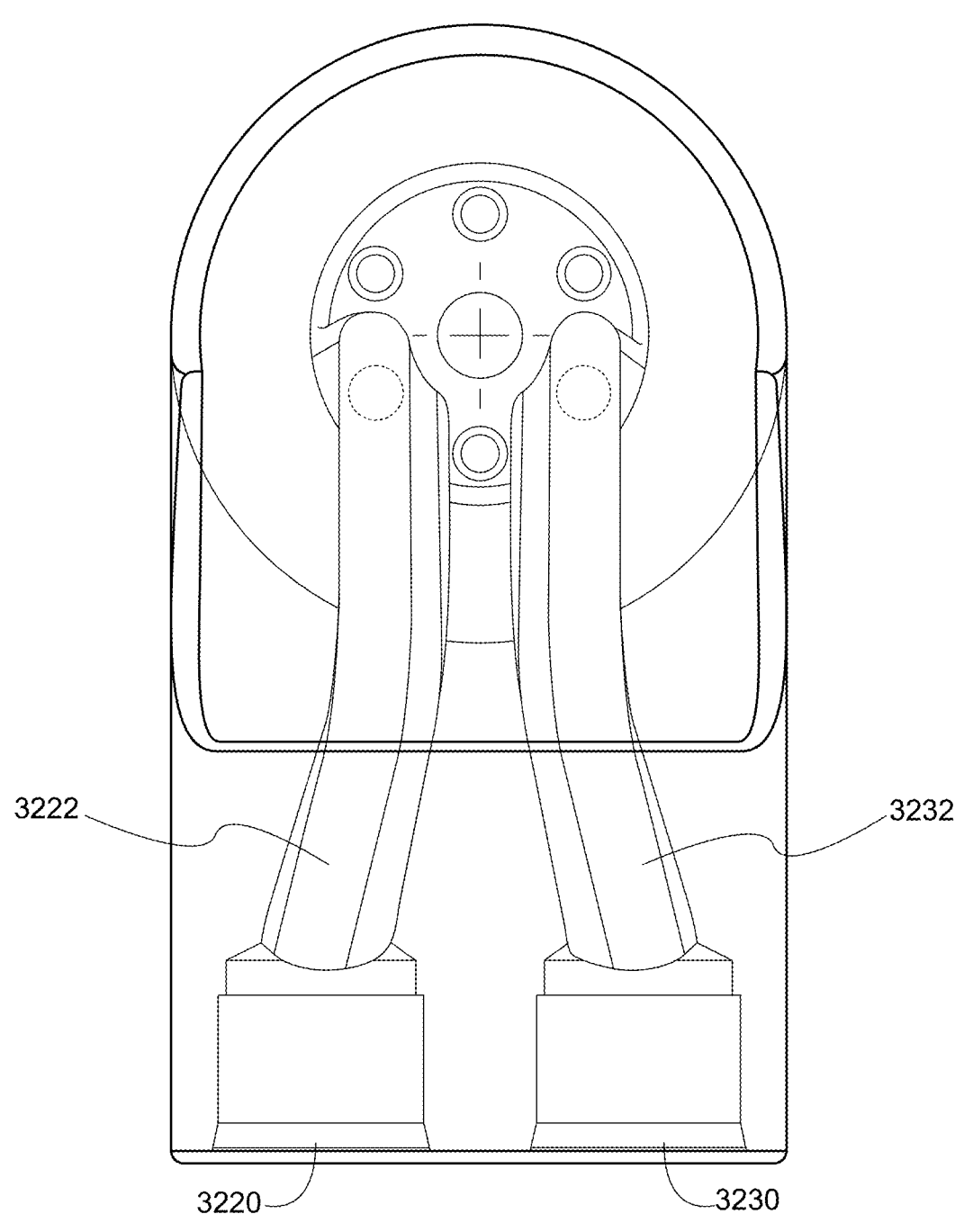

FIG. 10O and FIG. 10P illustrated the channels that may pass through the main body 3210 and the barrel 3250. For example, a first channel 3222 may be in fluid communication with the first port 3220 and may traverse the body 3210 upwards and at angle until the channel 3222 is substantially horizontal. The channel 3222 may, in this nonlimiting example embodiment, turn downward at about a ninety degree angle to traverse through the barrel 3250 where it exits the barrel at a first elevation. Similarly, a second channel 3232 may be in fluid communication with the second port 3230 and may traverse the body 3210 upwards and at angle until the channel 3232 is substantially horizontal. The channel 3232 may, in this nonlimiting example embodiment, turn downward at about a ninety degree angle to traverse through the barrel 3250 where it exits the barrel 3250 at a second elevation. As one skilled in the art would appreciate, when assembled, the barrel 3250 is inserted into the receiving area 3130 such that the exit of the first channel 3220 is in fluid communication with the second fluid receiving area 3160-2 and the exit of the second channel 3232 is in fluid communication with the first fluid receiving area 3160-1.

FIGS. 10O and P illustrate the spool 3200 as having a substantially solid member shown as translucent in order to highlight the first and second channels 3222 and 3232. One inventive feature of the channels 3222 and 3232 is the changing cross-section. As shown in FIGS. 10L and 10 M the cross-section of the channels is substantially circular in shape (see FIG. 10M) but transitions to an oval shape (see top of FIG. 10L) and thereafter a kidney bean shape (see bottom of FIG. 10L). This transition optimizes space constraints, allows for maximum flow area while maximizing wall thickness for increase pressure rating, and reduces fluid turbulence and heat buildup while reducing pressure loss. In addition, the portions of the channels 3222 and 3232 leaving the ports 3220 and 3230 may extend through the spool 3200 as non-parallel channels which may reduce the distance between the channels as they extend from the ports 3220 and 3230 through the spool 3200. Other portions of the channels 3222 and 3232 may be somewhat parallel as the channels 3222 and 3232 approach the barrel 3250. This aspect of this nonlimiting example embodiment conserves space and allows for a smaller spool 3200 than if the channels were designed as parallel channels.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What is claimed is:

1. A pin swivel comprising:
   a housing attachable to a mechanical assembly, the housing including at least one port configured to connect to at least one hose to receive at least one fluid from the at least one hose, and at least one channel configured to transfer the at least one fluid to at least one fluid transfer area; and
   a spool rotationally supported by the housing, the spool having at least one channel in fluid communication with the at least one fluid transfer area of the housing to receive the at least one fluid from the at least one fluid transfer area, and at least one port configured to receive the at least one fluid from the at least one channel of the spool, wherein at least one cross section of the at least one channel of the spool transitions from a circular shape to an oval shape and then to a kidney bean shape to reduce fluid turbulence and heat buildup.

2. The pin swivel of claim 1, wherein
   the at least one port of the housing includes a first port and as second port,
   the at least one channel of the housing includes a first channel and a second channel, the at least one fluid transfer area of the housing includes a first fluid transfer area and a second fluid transfer area, the at least one port of the spool includes a first port and a second port, the at least one channel of the spool includes a first channel that extends from the first port of the spool through a main body of the spool and a barrel of the spool and to at least one channel that is in fluid communication with the first fluid transfer area and a second channel that extends from the second port of the spool through the main body of the spool and the barrel of the spool and to at least one channel that is in fluid communication with the second fluid transfer area.

3. The pin swivel of claim 2, wherein the first and second channels of the spool extend upward from the first and second ports through the body of the spool, and downwards into the barrel of the spool.

4. The pin swivel of claim 3, where cross sections of the first and second channels of the spool transition from a circular shape to an oval shape and then a kidney bean shape to reduce fluid turbulence and heat buildup.

5. The pin swivel of claim 1, further comprising:

a spool head having at least one port in fluid communication with that at least one channel of the spool.

6. A method comprising:

attaching the pin swivel of claim 1 to the mechanical assembly, the mechanical assembly having a first arm pivotally connected to a second arm;

attaching at least one hose to the at least one port of the housing; and attaching at least one hose to the at least one port of the spool, wherein the pin swivel is located on the mechanical assembly at a location that reduces hose bend.

7. The method of claim 6, further comprising:

identifying a section of the at least one hose that connects to the at least one port of the housing that bends the most;

one of modifying or replacing the at least one hose that connects to the at least one port of the housing; and connecting the one of the modified or replaced at least one hose to the at least one port of the housing.

8. A method of retrofitting the mechanical assembly of claim 1 comprising:

identifying a section of the at least one hose that connects to the at least one port of the housing that bends the most;

one of modifying or replacing the at least one hose that connects to the at least one port of the housing; and connecting the one of the modified or replaced at least one hose to the at least one port of the housing.

* * * * *